United States Patent
Anvari et al.

(10) Patent No.: US 11,990,810 B2
(45) Date of Patent: May 21, 2024

(54) PRINTED CIRCUIT BOARD STATOR AXIAL FIELD ROTARY ENERGY DEVICE WITH FERROMAGNETIC YOKE AND COOLING PLATE

(71) Applicant: Infinitum Electric, Inc., Round Rock, TX (US)

(72) Inventors: Bahareh Anvari, Round Rock, TX (US); Paulo Guedes-Pinto, Round Rock, TX (US); Randal A. Lee, Austin, TX (US)

(73) Assignee: INFINITUM ELECTRIC INC., Round Rock, TX (US)

( * ) Notice: Subject to any disclaimer, the term of this patent is extended or adjusted under 35 U.S.C. 154(b) by 170 days.

(21) Appl. No.: 17/734,851

(22) Filed: May 2, 2022

(65) Prior Publication Data
US 2023/0353000 A1 Nov. 2, 2023

(51) Int. Cl.
*H02K 3/26* (2006.01)
*H02K 9/19* (2006.01)
*H02K 21/24* (2006.01)

(52) U.S. Cl.
CPC ............. *H02K 3/26* (2013.01); *H02K 9/19* (2013.01); *H02K 21/24* (2013.01); *H02K 2203/03* (2013.01); *H02K 2211/03* (2013.01)

(58) Field of Classification Search
CPC ............ H02K 3/26; H02K 9/19; H02K 21/24; H02K 2203/03; H02K 2211/03
USPC .......................................................... 310/71
See application file for complete search history.

(56) References Cited

U.S. PATENT DOCUMENTS

| | | |
|---|---|---|
| 10,141,804 B2 | 10/2018 | Schuler et al. |
| 10,135,310 B2 | 11/2018 | Schuler et al. |
| 10,141,803 B2 | 11/2018 | Schuler et al. |
| 10,186,922 B2 | 1/2019 | Schuler et al. |
| 10,340,760 B2 | 7/2019 | Schuler et al. |
| 10,680,479 B2 | 6/2020 | Schuler et al. |

(Continued)

FOREIGN PATENT DOCUMENTS

GB 2485185 5/2012

OTHER PUBLICATIONS

Notification of Transmittal of the International Search Report and the Written Opinion of the International Searching Authority, or the Declaration dated Aug. 18, 2023 (Aug. 18, 2023), 8 pages, issued on related International Patent Application PCT/US23/18173 by the International Searching Authority / US.

*Primary Examiner* — Rashad H Johnson
(74) *Attorney, Agent, or Firm* — Dickinson Wright PLLC

(57) ABSTRACT

A device has a housing and a rotor with an axis and a rotor disk with a magnet. A cooling plate is coupled to the housing. The cooling plate includes a channel connected to an inlet and an outlet to convey a liquid coolant. A stator is coaxial with the rotor and includes a printed circuit board with conductive layers laminated together with layers of an insulating material. Each conductive layer has coils that can carry electrical current when connected to an external voltage source. The stator is mechanically coupled to the housing, so the stator reacts to torque produced by the device. A ferromagnetic yoke is mechanically and thermally coupled to the stator and to the cooling plate to provide a path for magnetic flux produced by the magnet and a path to conduct heat generated by the stator from the stator to the cooling plate.

20 Claims, 15 Drawing Sheets

(56) References Cited

U.S. PATENT DOCUMENTS

| | | | | |
|---|---|---|---|---|
| 11,476,734 B1* | 10/2022 | Lee | ........................ | H02K 5/203 |
| 11,827,371 B1* | 11/2023 | Chong | .................... | H02K 1/274 |
| 2014/0034402 A1 | 2/2014 | Woolmer | | |
| 2019/0109504 A1 | 4/2019 | Schuller et al. | | |
| 2020/0403468 A1* | 12/2020 | Takahashi | .............. | H02K 9/197 |
| 2021/0067016 A1* | 3/2021 | Hunstable | ................ | H02K 3/47 |
| 2021/0135549 A1* | 5/2021 | Lee | .......................... | H02K 9/06 |
| 2021/0143697 A1* | 5/2021 | Lee | ...................... | H05K 1/0298 |
| 2021/0265889 A1* | 8/2021 | Frampton | ................. | H02K 3/26 |
| 2021/0384784 A1* | 12/2021 | Takahashi | ............ | H02K 1/2791 |
| 2022/0302789 A1* | 9/2022 | Jensen | ................... | H02K 16/00 |
| 2022/0329132 A1* | 10/2022 | Guedes-Pinto | .......... | H02K 9/19 |
| 2023/0036536 A1* | 2/2023 | Milheim | ................ | H02K 21/24 |
| 2023/0352999 A1* | 11/2023 | Anvari | ..................... | H02K 9/19 |
| 2023/0361634 A1* | 11/2023 | Anvari | ..................... | H02K 1/02 |
| 2023/0361637 A1* | 11/2023 | Ibrahim | ................ | H02K 21/12 |

\* cited by examiner

PRINTED CIRCUIT BOARD STATOR AXIAL FIELD ROTARY ENERGY DEVICE WITH FERROMAGNETIC YOKE AND COOLING PLATE

BACKGROUND OF THE INVENTION

Field of the Invention

The present disclosure relates in general to an axial field rotary energy devices and, in particular, to a system, method and apparatus for motors and generators having one or more printed circuit board (PCB) stators.

Description of the Prior Art

Some axial field rotary energy devices, such as motors or generators, use printed circuit board (PCB) stator structures. Examples of such devices are described in U.S. Pat. Nos. 10,141,803, 10,135,310, 10,340,760, 10,141,804, 10,680,479 and 10,186,922. These devices with PCB stator structures do not have a ferromagnetic stator core and typically use two rotor disks to establish a magnetic circuit. The rotor disks have permanent magnets that establish the magnetic field which interacts with the magnetic field produced by the PCB stator to generate torque (for motors) or induce electromotive forces (EMF) on the PCB stator (for generators). By coupling a reduced mass stator core to the PCB stator, one of the rotor disks can be eliminated resulting in a simpler axial field electric machine.

SUMMARY

Embodiments of an axial field rotary energy device are disclosed. For example, the device can include a housing and a rotor coupled to the housing. The rotor can have an axis of rotation and a rotor disk with a magnet. A cooling plate can be coaxial with the rotor and coupled to the housing. The cooling plate can include a continuous sealed channel connected to an inlet and an outlet and configured to convey a liquid coolant. A stator can be coaxial with the rotor and include a printed circuit board (PCB) having a plurality of conductive layers laminated together with layers of an insulating material. Each conductive layer can have coils that can carry electrical current when connected to an external voltage source. The stator can be mechanically coupled to the housing, so the stator reacts to torque produced by the device. A ferromagnetic yoke can be coaxial with the rotor and the stator. The ferromagnetic yoke can be mechanically and thermally coupled to the stator and to the cooling plate to provide a path for magnetic flux produced by the magnet and a path to conduct heat generated by the stator from the stator to the cooling plate. Numerous other embodiments also are described in this disclosure.

BRIEF DESCRIPTION OF THE DRAWINGS

So that the manner in which the features and advantages of the embodiments are attained and can be understood in more detail, a more particular description can be had by reference to the embodiments that are illustrated in the appended drawings. However, the drawings illustrate only some embodiments and are not to be considered limiting in scope since there can be other equally effective embodiments.

It shall be noted that some of the details and/or features shown in the drawings herein may not be drawn to scale for clarity purposes.

DETAILED DESCRIPTION

Figure 1:
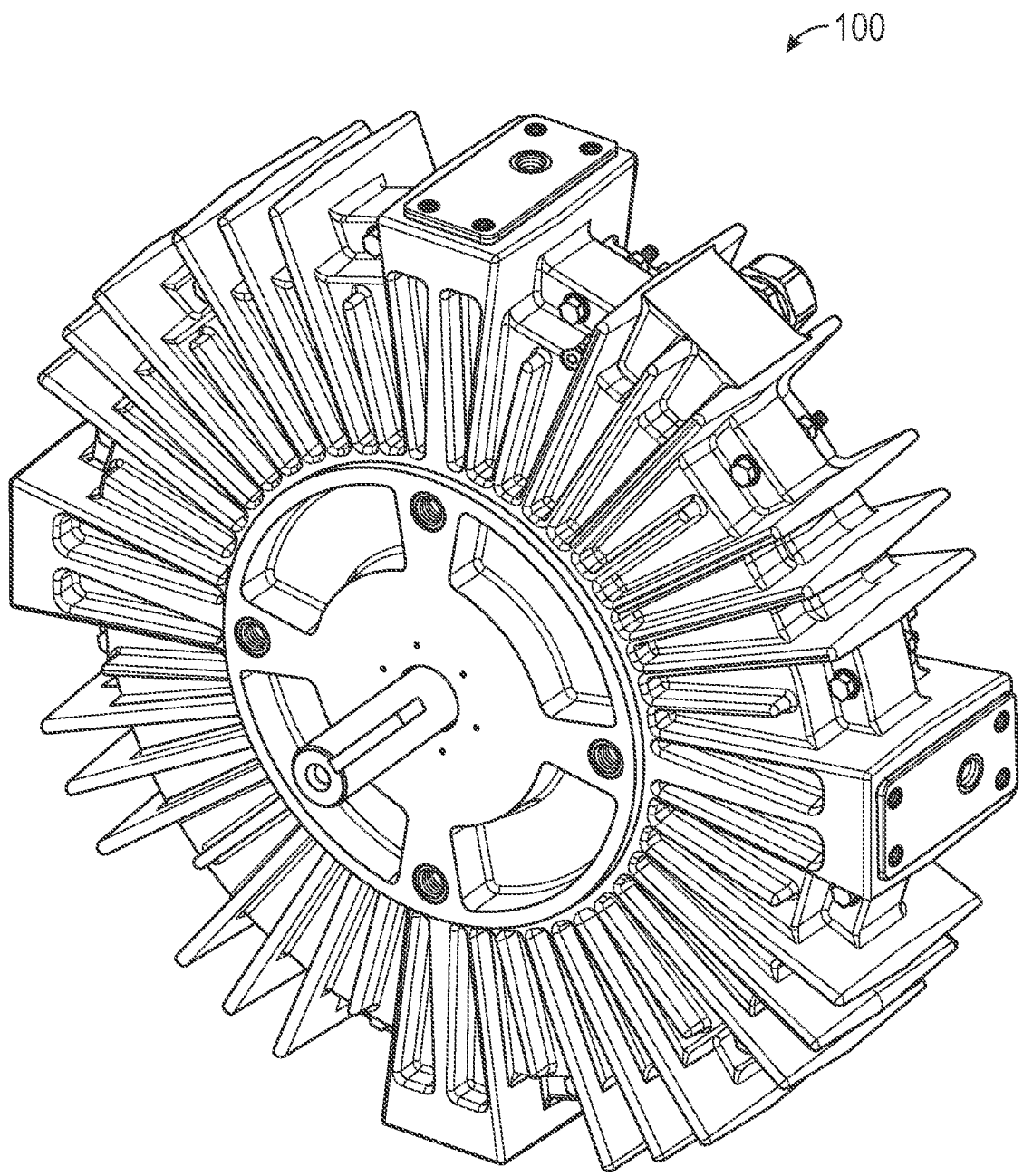
FIG. 1 is an isometric view of an embodiment of an axial field rotary energy device.
Figure 2:
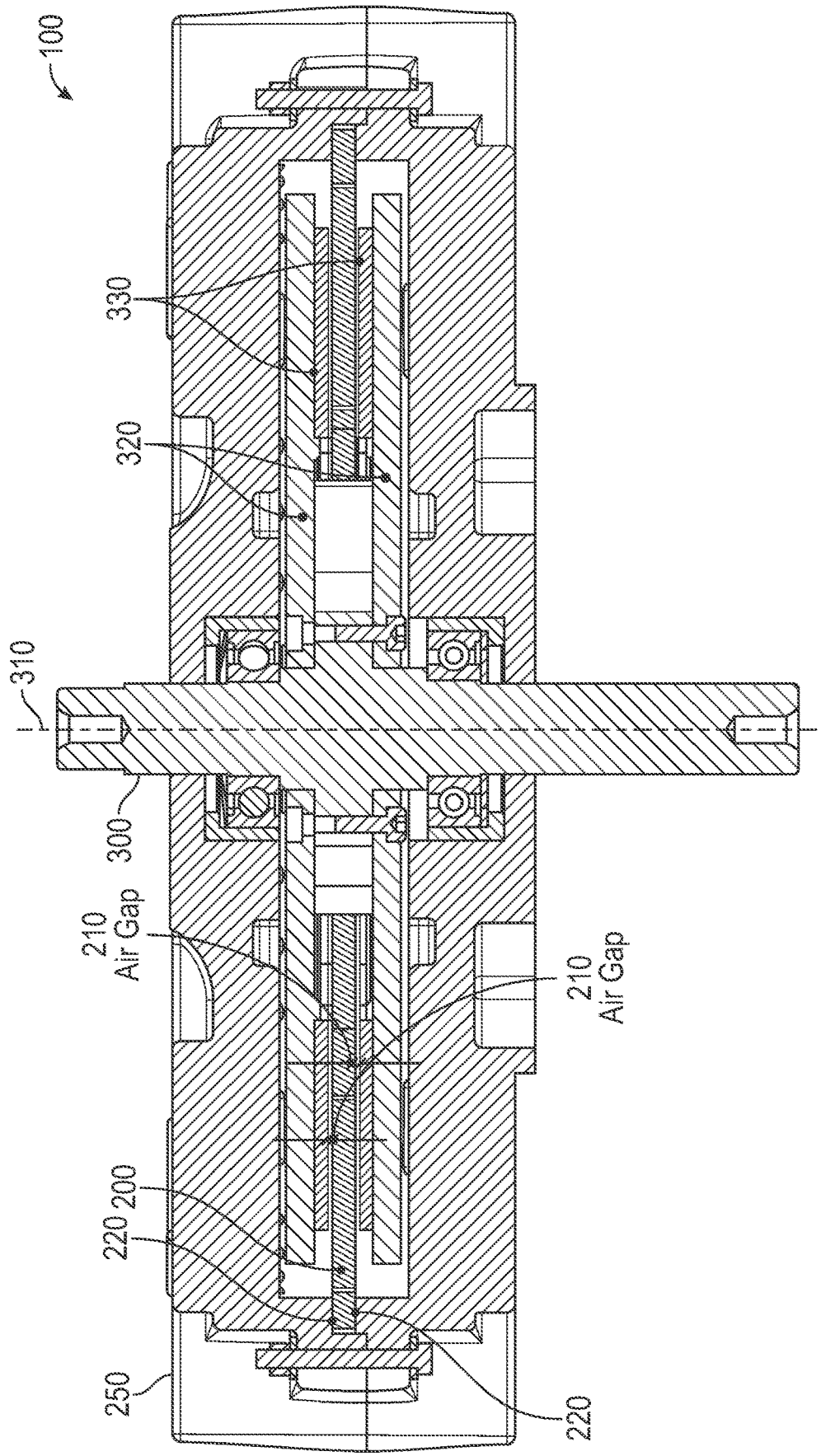
FIG. 2 is a sectional view of an embodiment of an axial field rotary energy device with two rotors and one PCB stator.

Referring to FIGS. 1-15, some axial field rotary energy devices, such as device 100 (FIG. 1), can include one, two or more PCB stators. Each PCB stator can have layers assigned to different phases such as, for example, a PCB stator with three phases. FIG. 2 depicts the cross section of a typical axial field rotary energy device 100. The device 100 can include one rotor 300 that can rotate about an axis of rotation 310. The rotor 300 can have two coaxial rotor disks 320 that carry permanent magnets 330. The device 100 can have at least one PCB stator 200 coaxial with the rotor 300 relative to the axis of rotation 310. Rotor 300 and PCB stator 200 are contained by an enclosure 250. The PCB stator 200 is mechanically coupled to the housing 250 and can comprise a plurality of conductive layers of copper foil laminated together with layers of an insulating material such as FR4 epoxy-glass laminate, for example. Each copper foil layer is etched forming a plurality of coils that can carry electrical currents when connected to an external voltage source. In this embodiment, the PCB stator 200 is located between the two rotor disks 310. During assembly of the device 100, the position of the PCB stator 200 can be adjusted axially to make the air gaps 210 substantially equal. The PCB stator 200 axial position can be adjusted by adding or removing shims 220 around the edge where the PCB stator 200 abuts the housing 250.

Figure 3A:
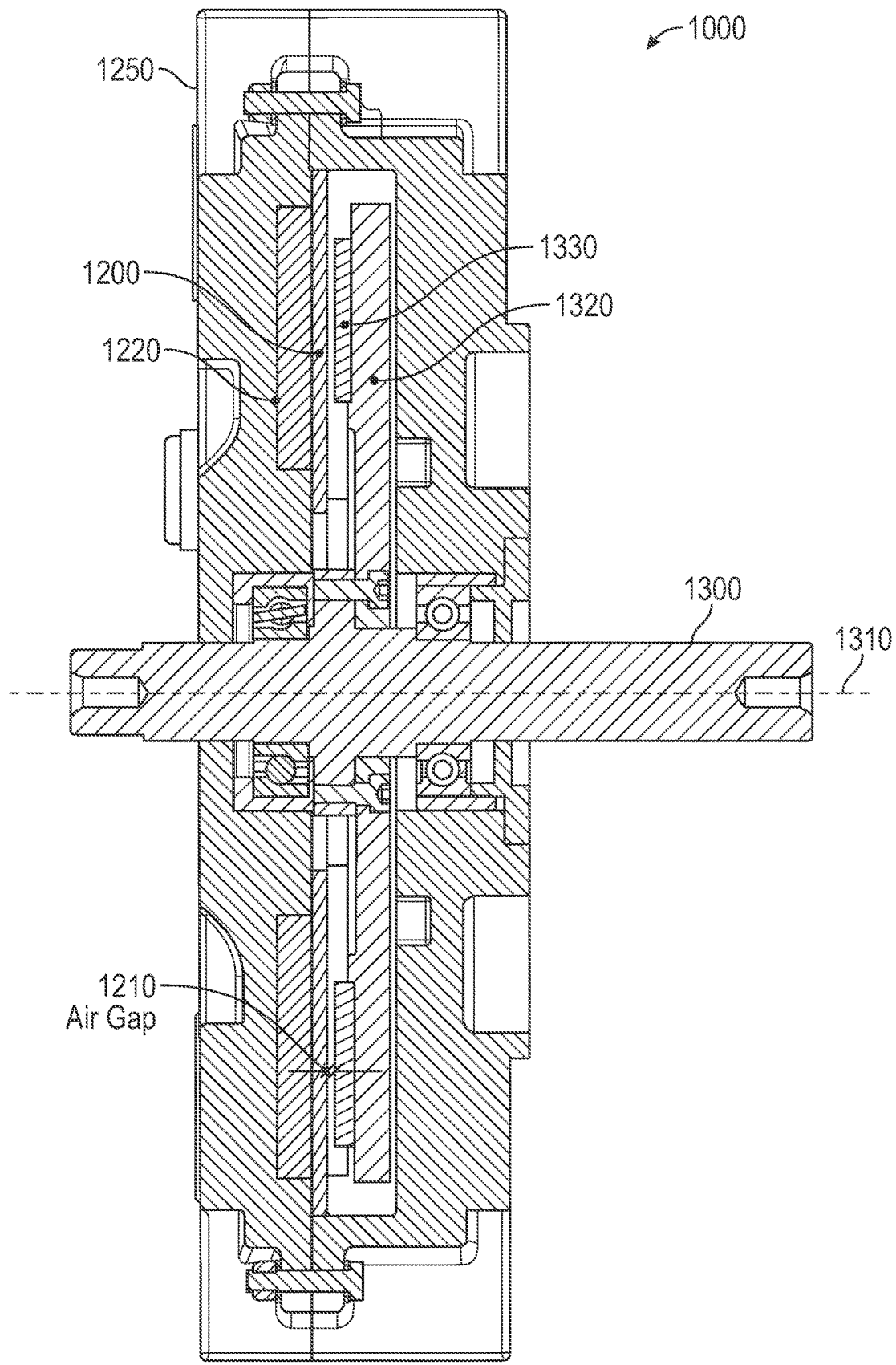
FIG. 3A is a sectional view of an embodiment of an axial field rotary energy device with one rotor and one PCB stator coupled to a ferromagnetic yoke.
Figure 3B:
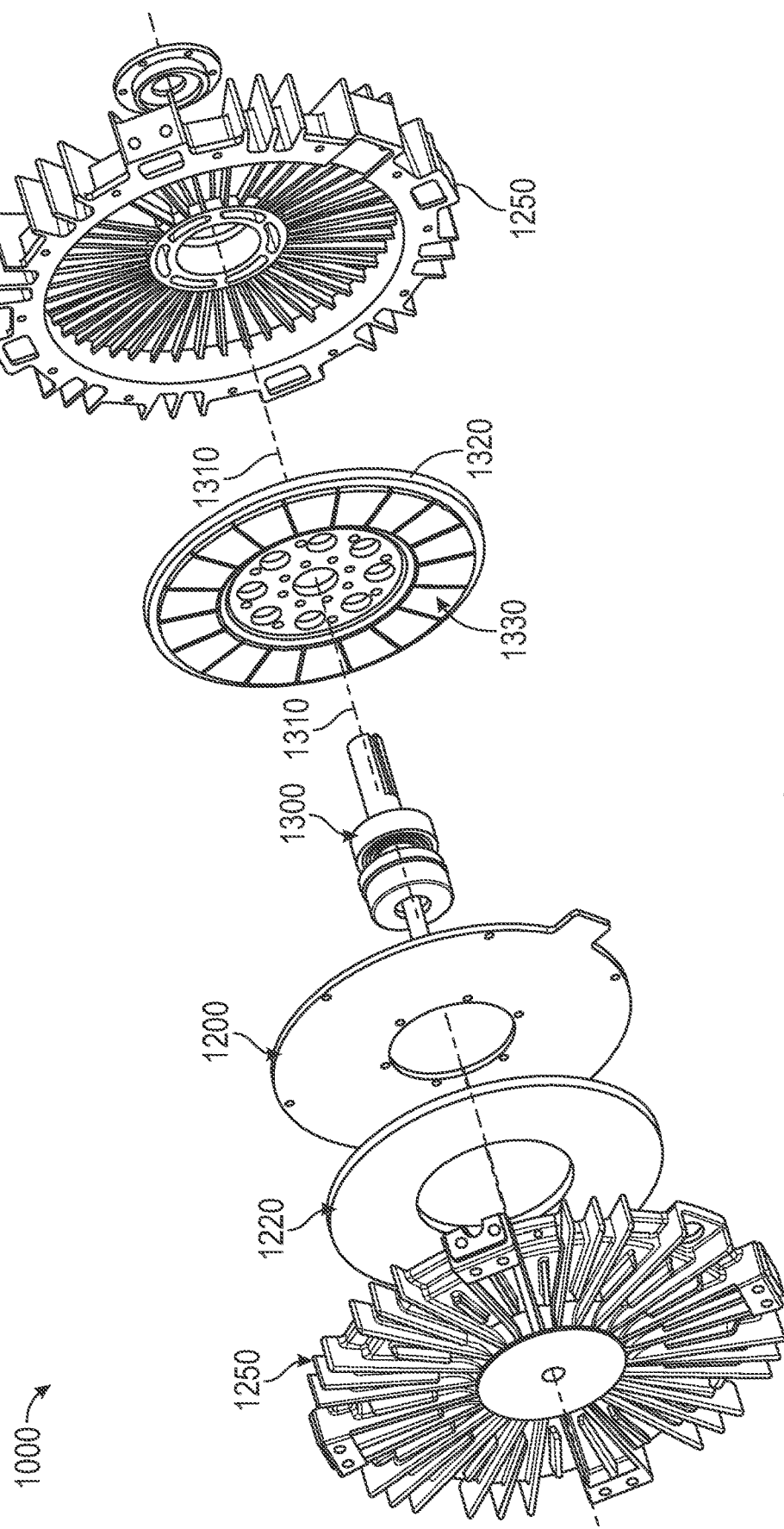
FIG. 3B is an exploded view of an embodiment of an axial field rotary energy device with one rotor and one PCB stator coupled to a ferromagnetic yoke.

FIGS. 3A and 3B show an embodiment of an axial field rotary energy device 1000 having a rotor 1300 that can rotate about an axis of rotation 1310. The rotor can have a single rotor disk 1320 carrying permanent magnets 1330. The magnets 1330 can be mechanically bound to the rotor disk 1320 by means of a high strength adhesive, by means of fasteners or combinations of both, in some versions. The device 1000 can have a PCB stator 1200 coaxial with the rotor 1300. The PCB stator 1200 can comprise a plurality of conductive layers of copper foil laminated together with layers of an insulating material such as FR4 epoxy-glass laminate, for example. Each copper foil layer is etched forming a plurality of coils that can carry electrical currents when connected to an external voltage source. The PCB stator 1200 is coupled mechanically to the housing 1250. The mechanical coupling between the PCB stator 1200 and the housing 1250 can be the main mechanism whereby the PCB stator 1200 reacts to the torque generated during the operation of device 1000. The PCB stator 1200 is mechanically coupled to a ferromagnetic yoke 1220 which, in turn, is also coaxial with rotor 1300 and mechanically coupled to the housing 1250. The mechanical coupling between the PCB stator 1200 and the ferromagnetic yoke 1220 is not intended to react to the torque generated during the operation of device 1000, in some embodiments. The ferromagnetic yoke 1220 provides a path for the magnetic flux produced by the permanent magnets 1330. The rotor 1300, PCB stator 1200 and yoke 1220 are contained by the housing 1250. In the embodiment depicted in FIGS. 3A and 3B, the device 1000, has only one air gap 1210 (FIG. 3A) making the assembly process simpler when compared to device 100.

In some embodiments of the device 1000, the ferromagnetic yoke 1220 can be thermally coupled to the PCB stator 1200 and to the housing 1250 by means of thermal paste applied to respective interfaces, for example. In other embodiments, the PCB stator 1200 can be thermally and mechanically coupled to the ferromagnetic yoke 1220 by means of a layer of thermally conductive epoxy adhesive, or a thermally conductive silicone adhesive, for example. In all these embodiments the ferromagnetic yoke 1220 can help conduct the heat generated by the PCB stator 1200 to the housing 1250.

Figure 4A:
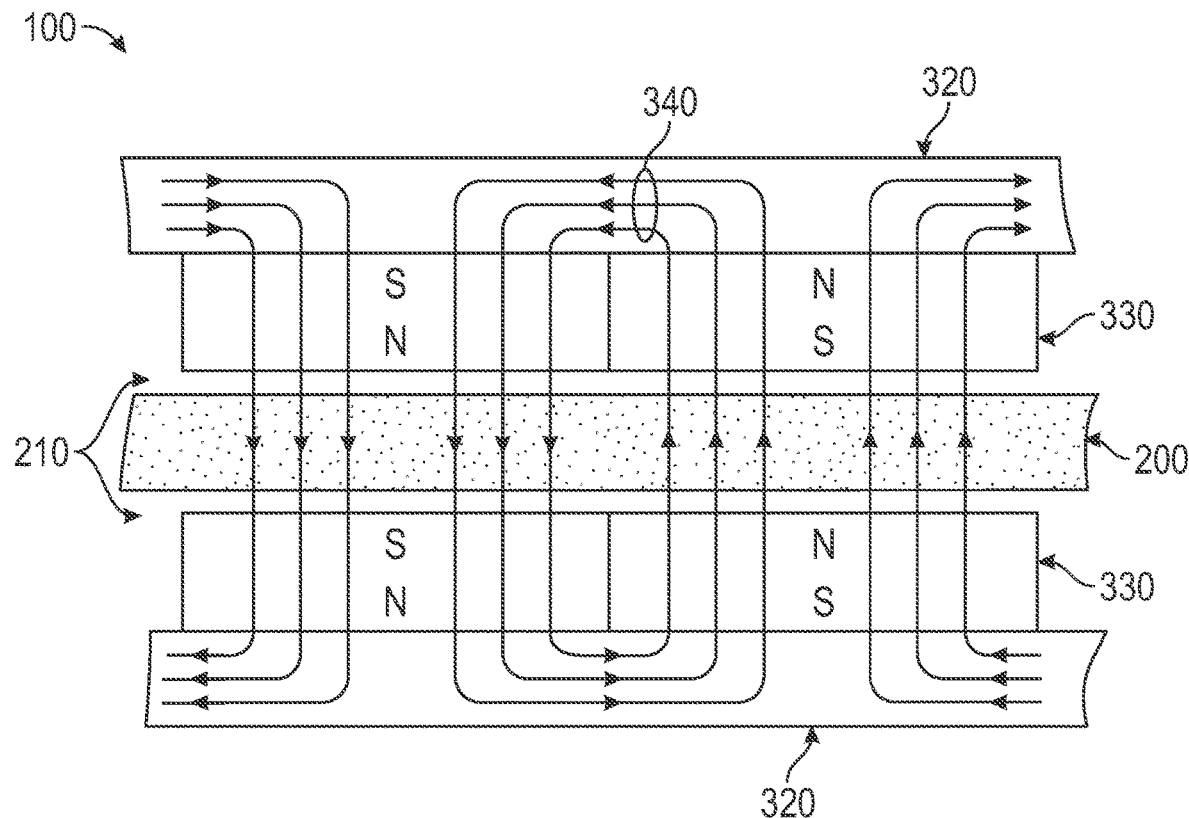
FIG. 4A is a schematic sectional view of the magnet, rotor and PCB stator arrangement of an embodiment of an axial field rotary energy device.

FIG. 4A shows a detail of the axial field rotary energy device 100 shown in FIG. 2, depicting the rotor disks 320, magnets 330 and PCB stator 200. In the embodiment depicted in FIG. 4A, the magnets 330 produce a magnetic field, having flux 340 represented by lines and arrows in FIG. 4A. The magnetic flux 340 flows from one magnet 330 located in one rotor disk 320 to a corresponding magnet 330 with the same magnetic orientation on the other rotor disk 320, while crossing the air gaps 210 and the PCB stator 200. Inside the rotor disks 320, the magnetic flux 340 flows from one magnet 330 to the adjacent magnets 330 with opposite magnetic orientation, where it changes direction and flows again from one magnet 330 on one rotor disk 320 to the correspondingly opposed magnet 330 in the other rotor disk 320.

Figure 4B:
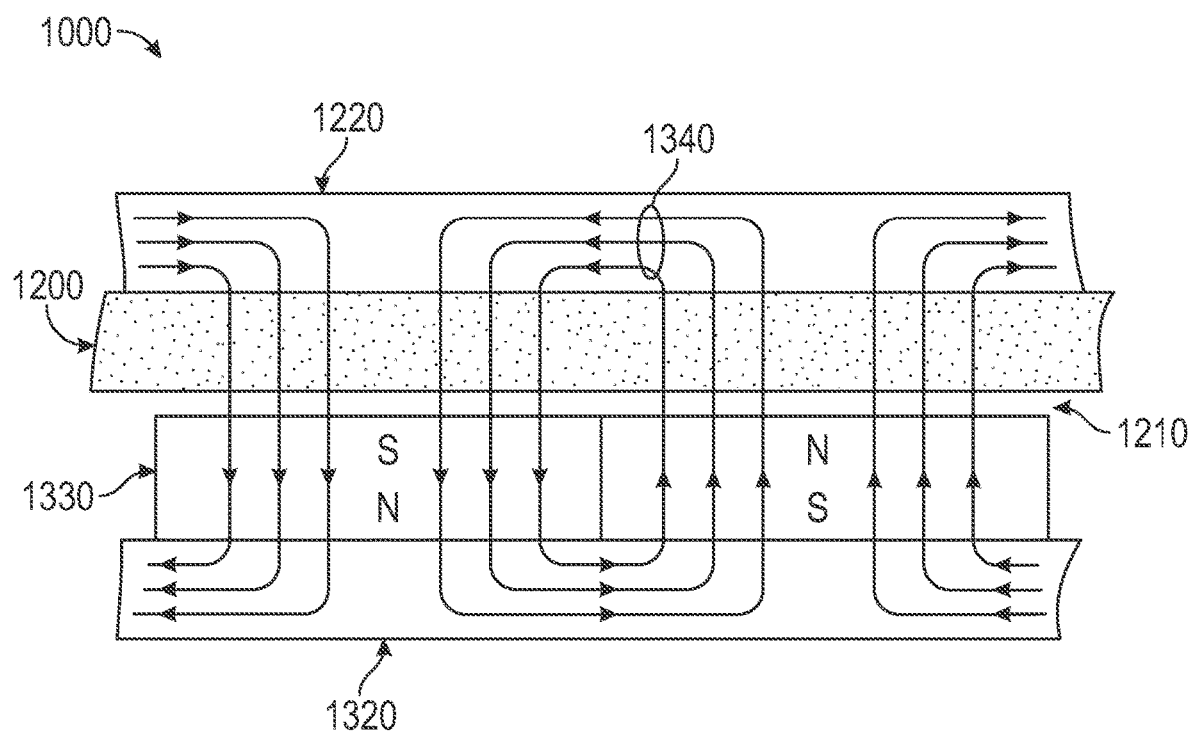
FIG. 4B is a schematic sectional view of the magnet, rotor, PCB stator and yoke arrangement of another embodiment of an axial field rotary energy device.

In contrast, FIG. 4B shows a detail of the axial field rotary energy device 1000 shown in FIGS. 3A and 3B depicting the rotor disk 1320, magnets 1330, PCB stator 1200 and ferromagnetic yoke 1220. In the embodiment depicted in FIG. 4B, magnets 1330 produce a magnetic field, having flux 1340 represented by lines and arrows in FIG. 4B. The magnetic flux 1340 flows from one magnet 1330 across the air gap 1210, PCB stator 1200 into the ferromagnetic yoke 1220. In the ferromagnetic yoke 1220, the magnetic flux 1340 changes direction, flows sideways, and changes direction again going across the PCB stator 1200, air gap 1210, magnets 1330 and into the rotor disk 1320, where it changes direction, flows sideways, and changes direction again to repeat the flow path.

Figure 5A:
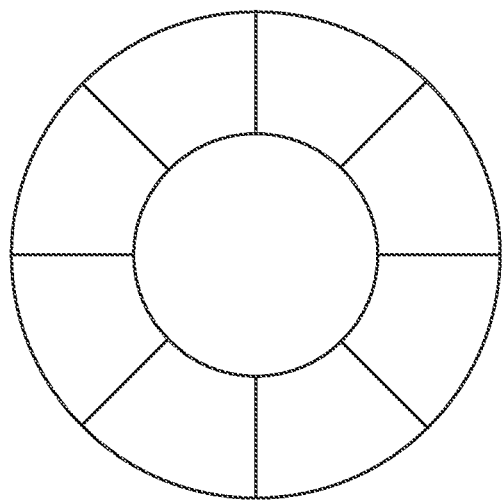
FIG. 5A is a front view of an embodiment of a segmented ferromagnetic yoke.
Figure 5B:
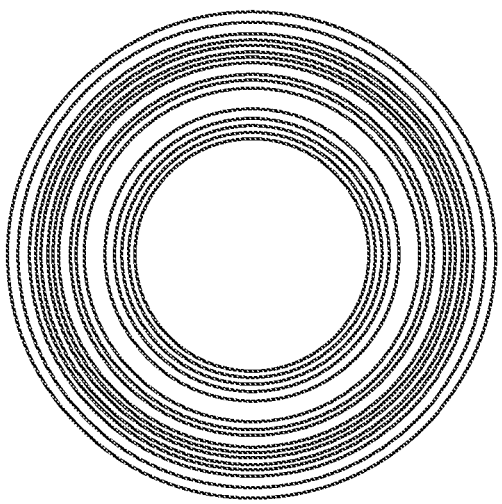
FIG. 5B is a front view of an embodiment of a laminated ferromagnetic yoke.

In the embodiments of the axial field rotary energy device 1000 shown in FIGS. 3A, 3B and 4B, the ferromagnetic yoke 1220 can be made of a low loss, soft ferromagnetic material, so during operation of the device 1000, the hysteretic and eddy current losses in the ferromagnetic yoke 1220 are reduced. When the magnetic flux is removed, the ferromagnetic yoke 1220 does not present any remanent magnetization. In addition, the material of the ferromagnetic yoke 1220 can have high magnetic permeability (e.g., at least 2,000 relative permeability), so the volume of the ferromagnetic yoke 1220 can be reduced. The ferromagnetic yoke 1220 can be made of a solid ring of soft ferrite as shown in FIG. 3B, or can be made of soft ferrite segments bonded together to form a ring as shown in FIG. 5A, in some versions. In another version, the ferromagnetic yoke 1220 can be made of a continuously wound strip of a thin high permeability (e.g., 5,000 relative permeability or more) soft ferromagnetic alloy to form a laminated yoke as shown in FIG. 5B. The ferromagnetic yoke 1220 shown in FIGS. 3A, 3B and 5A can be made of a soft ferrite material such as Mn—Zn or Ni—Zn compounds, for example. The wound strip shown in FIG. 5B can be made of 0.5 mm thick M-19 silicon steel, 0.25 mm thick HF-10 silicon steel, or 0.25 mm thick Permalloy 80, for example. Although FIG. 5A shows a ferromagnetic yoke 1220 having 8 segments with the same angular span, other embodiments can have a different number of segments (e.g., 2, 3, 4, 5, 6, and others). Still other embodiments can have segments with unequal angular spans.

In some embodiments of the axial field rotary energy device 1000 the ferromagnetic yoke 1220 has a radial width "W" (FIG. 5C) that is substantially similar to the magnet 1330 radial length "L". In other embodiments, W can be up to 10% larger or smaller than L.

Figure 6:
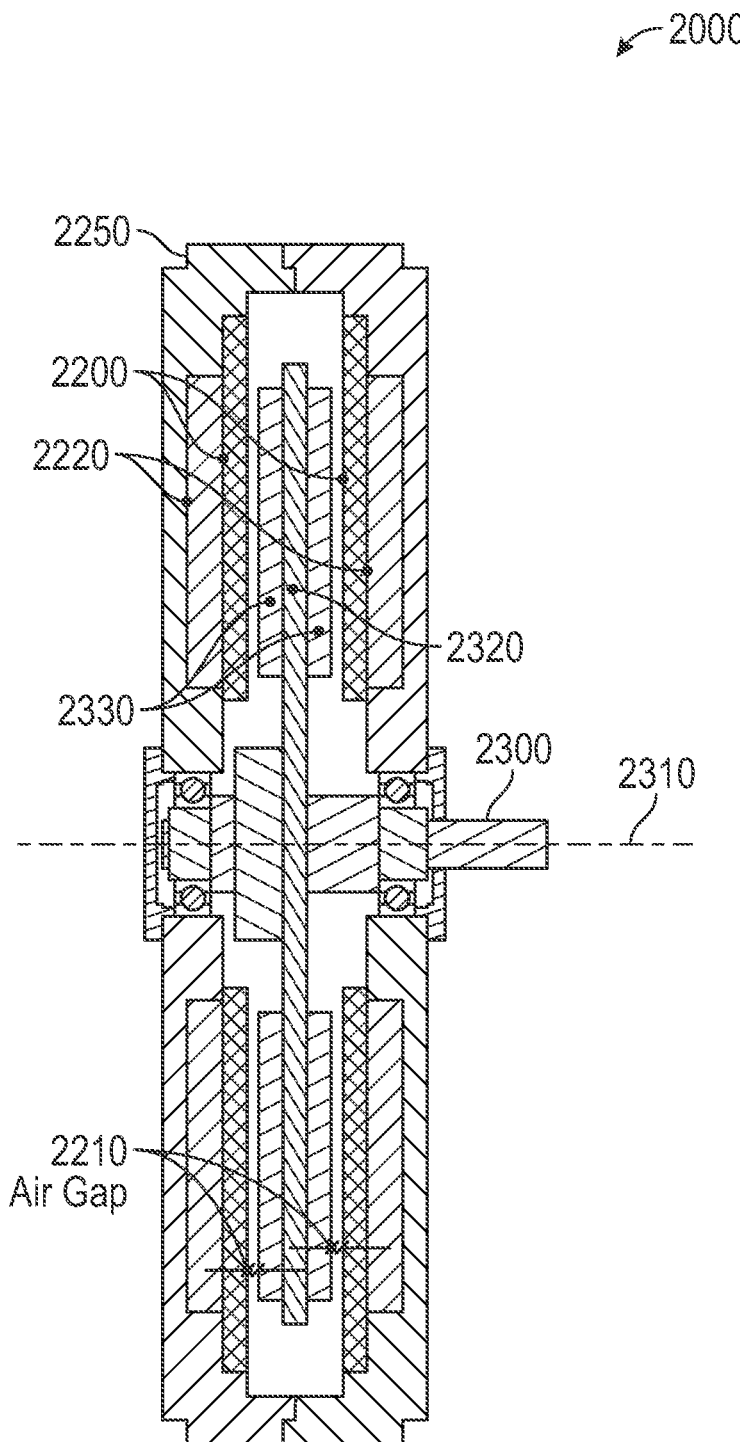
FIG. 6 is a sectional view of an embodiment of an axial field rotary energy device with one rotor and two PCB stators coupled to ferromagnetic yokes.

FIG. 6 shows an embodiment of an axial field rotary energy device 2000 having a rotor 2300 that can rotate about an axis of rotation 2310. Rotor 2300 can have one rotor disk 2320 that carries magnets 2330 on both major surfaces of the disk, in some versions. The magnets 2330 can be mechanically bound to the rotor disk 2320 by means of a high strength adhesive, by means of fasteners or combinations of both, in some examples. Facing the magnets 2330 on both sides of the disk 2320, embodiments of device 2000 can have PCB stators 2200. Each PCB stator 2200 can be coupled mechanically to the housing 2250 and a ferromagnetic yoke 2220 which, in turn, is coupled mechanically to the housing 2250. The mechanical coupling between the PCB stators 2200 and the housing 2250 can be the main mechanism whereby the PCB stators 2200 react to the torque generated during the operation of device 2000. The mechanical coupling between the PCB stators 2200 and the corresponding ferromagnetic yokes 2220 is not intended to react to the torque generated during the operation of device 2000, in some versions. In this embodiment, air gaps 2210 exist between the PCB stators 2200 and the magnets 2330 mounted on the rotor disk 2320. The air gaps 2210 can be substantially equal.

In some embodiments of the device 2000, the ferromagnetic yokes 2220 can be thermally coupled to the PCB stators 2200 and to the housing 2250 by means of thermal paste applied to respective interfaces, for example. In other embodiments, the PCB stators 2200 can be thermally and mechanically coupled to the ferromagnetic yoke 2220 by means of a layer of thermally conductive epoxy adhesive, or a thermally conductive silicone adhesive, for example. In all these embodiments the ferromagnetic yokes 2220 can help conduct the heat generated by the PCB stators 2200 to the housing 2250.

Figure 7:
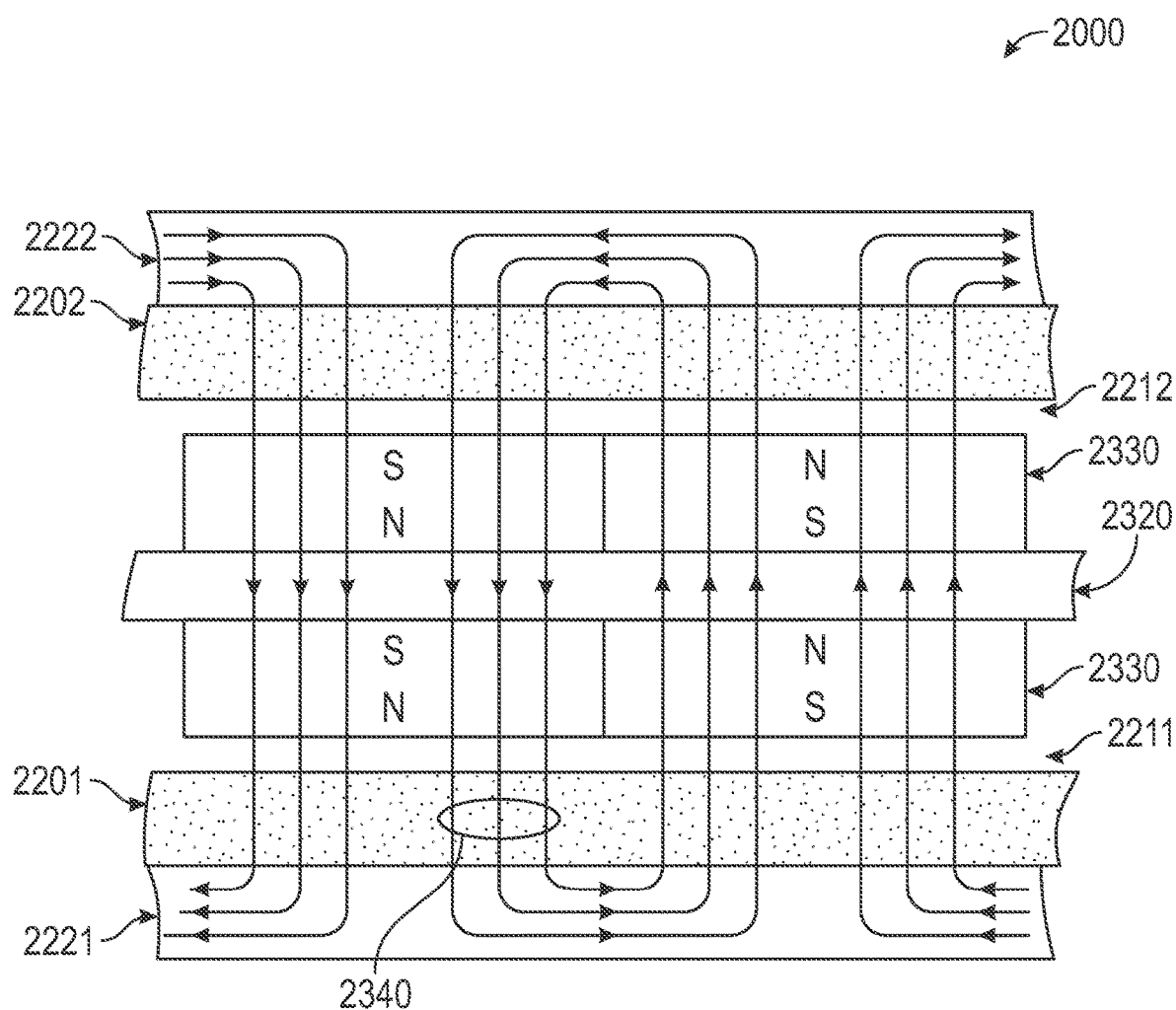
FIG. 7 is a schematic sectional view of the magnet, rotor, PCB stator, and yoke arrangement of an embodiment of an axial field rotary energy device.

FIG. 7 shows a detail of the axial field rotary energy device 2000 shown in FIG. 6 depicting the rotor disk 2320, magnets 2330, PCB stators 2201 and 2202, and corresponding ferromagnetic yokes 2221 and 2222. In this embodiment, magnets 2330 can be arranged in the rotor disk 2320, so that the magnets 2330 on the opposite side of the rotor disk 2320 have the same magnetic orientation to form pairs. A first pair of magnets 2330 produces a magnetic field, having flux 2340 represented by lines and arrows in FIG. 7. The magnetic flux 2340 flows across a first air gap 2211, a first PCB stator 2201, and into a first ferromagnetic yoke 2221. The magnetic flux 2340 then changes direction, flows sideways and changes direction again going back across the first PCB stator 2201, first air gap 2211 and through a second pair of magnets 2330 adjacent to the first pair of magnets 2330, but with opposite magnetic orientation. The magnetic flux 2340 continues across a second air gap 2212, a second PCB stator 2202 and into a second ferromagnetic yoke 2222. The magnetic flux 2340 then changes direction, flows sideways, and changes direction again going back across the second PCB stator 2202, second air gap 2212 and through an adjacent pair of magnets 2330. This pattern of circulation of the magnetic flux 2340 repeats itself around the entire circumference of the axial field rotary energy device 2000. Similar to the embodiments depicted in FIGS. 3A and 3B, examples of the ferromagnetic yokes 2221, 2222 of device 2000 can be made of solid disks of soft ferrite, soft ferrite segments, or laminated soft magnetic materials as depicted in FIGS. 5A and 5B.

Figure 5C:
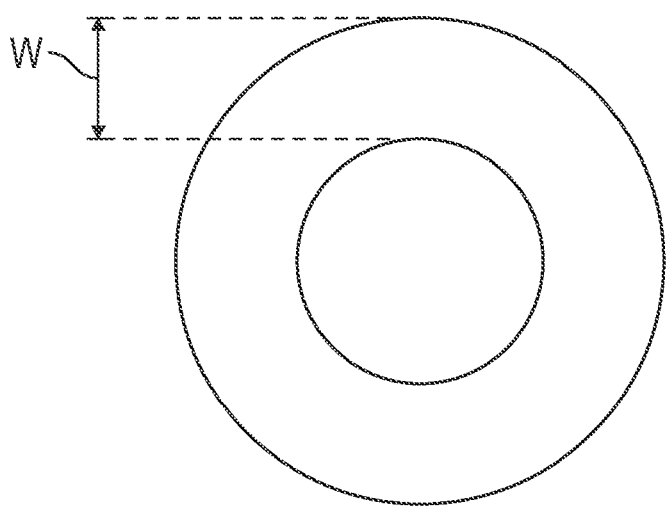
FIG. 5C is a front view of an embodiment of a ferromagnetic yoke and magnet.
Figure 5C:
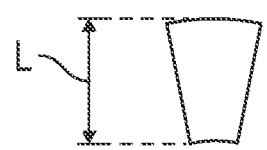

In some embodiments of the device 2000, each ferromagnetic yoke 2221, 2222 can have a radial width W that is substantially similar to the magnet radial length L, as depicted in FIG. 5C. In other embodiments, the ferromagnetic yoke radial width W can be up to 10% larger or smaller than the magnet radial length L.

Figure 8:
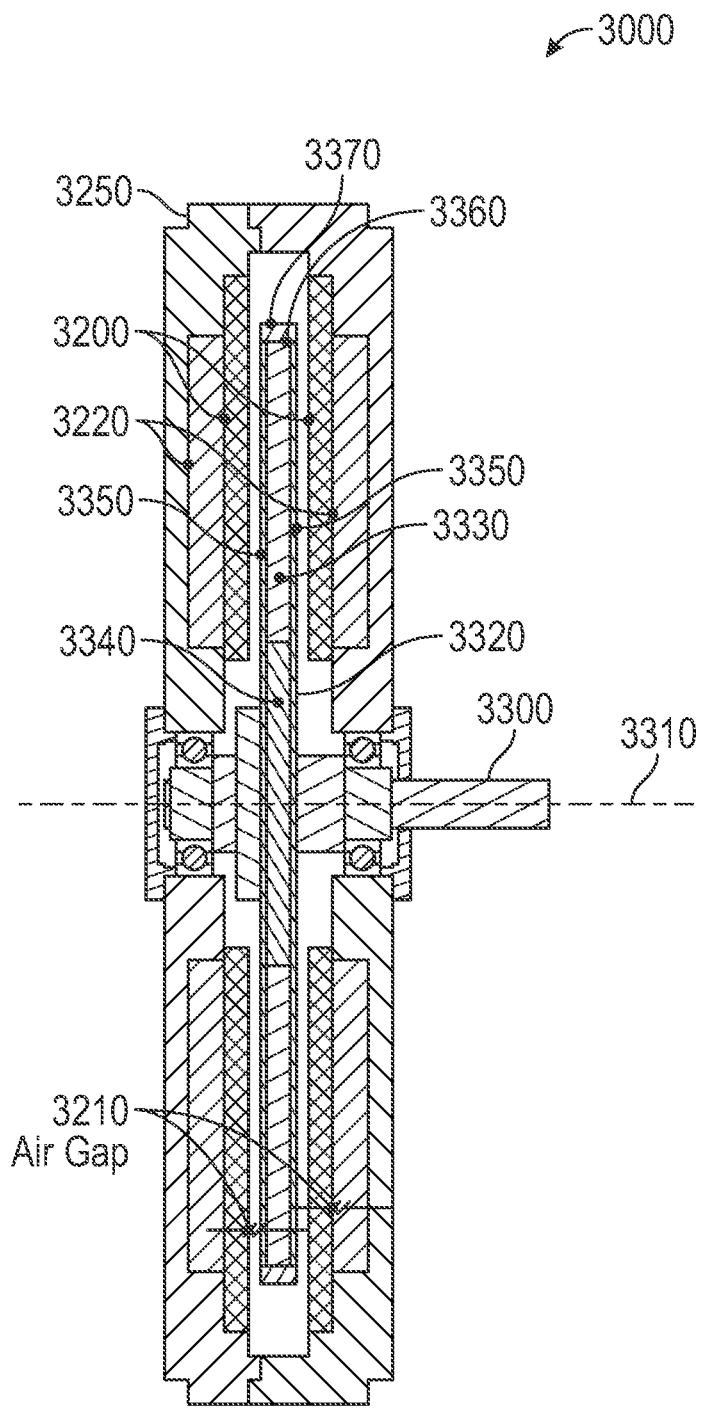
FIG. 8 is a sectional view of an embodiment of an axial field rotary energy device with one rotor and two PCB stators coupled to ferromagnetic yokes.

FIG. 8 shows an embodiment of an axial field rotary energy device 3000 where the device can have a rotor 3300 that can rotate about an axis of rotation 3310. Rotor 3300 can have a rotor disk 3320 comprising a circular core 3340 sandwiched between two circular plates 3350. The circular plates 3350 can be thin (0.5 to 2.0 mm thick, for example). The circular plates 3350 can be mechanically coupled to the rotor disk 3320 by means of an adhesive, such as an epoxy glue, for example, or with fasteners, such as flat head screws, for example. The circular core 3340 and the two adjoining circular plates 3350 are coaxial with the axis of rotation 3310 and define a circumferential channel that can receive magnets 3330. The outer diameter of the circular plates 3350 and magnets 3330 are substantially the same and define a cylindrical surface 3360 that is concentric with the rotor axis of rotation 3310. To retain the magnets 3330 radially, a retaining ring 3370 can be coupled to the cylindrical surface 3360. The circular core 3340, plates 3350 and retaining ring 3370 can be made of one or more nonmagnetic materials such as carbon fiber composite, Inconel 625, titanium Grade 9 3AL-2.5V, for example, so they do not interfere with the magnetic flux produced by the magnets 3330. In some embodiments, the retaining ring 3370 can be press fit over the rotor disk 3320 and magnets 3330. In some embodiments, the circular core 3340 and one of the plates 3350 can be a single monolithic piece. In other embodiments, the circular core 3340 can be made of a different material than the plates 3350. The circular core 3340 also can be made of a light material such as aluminum 6061, for example.

Figure 9:
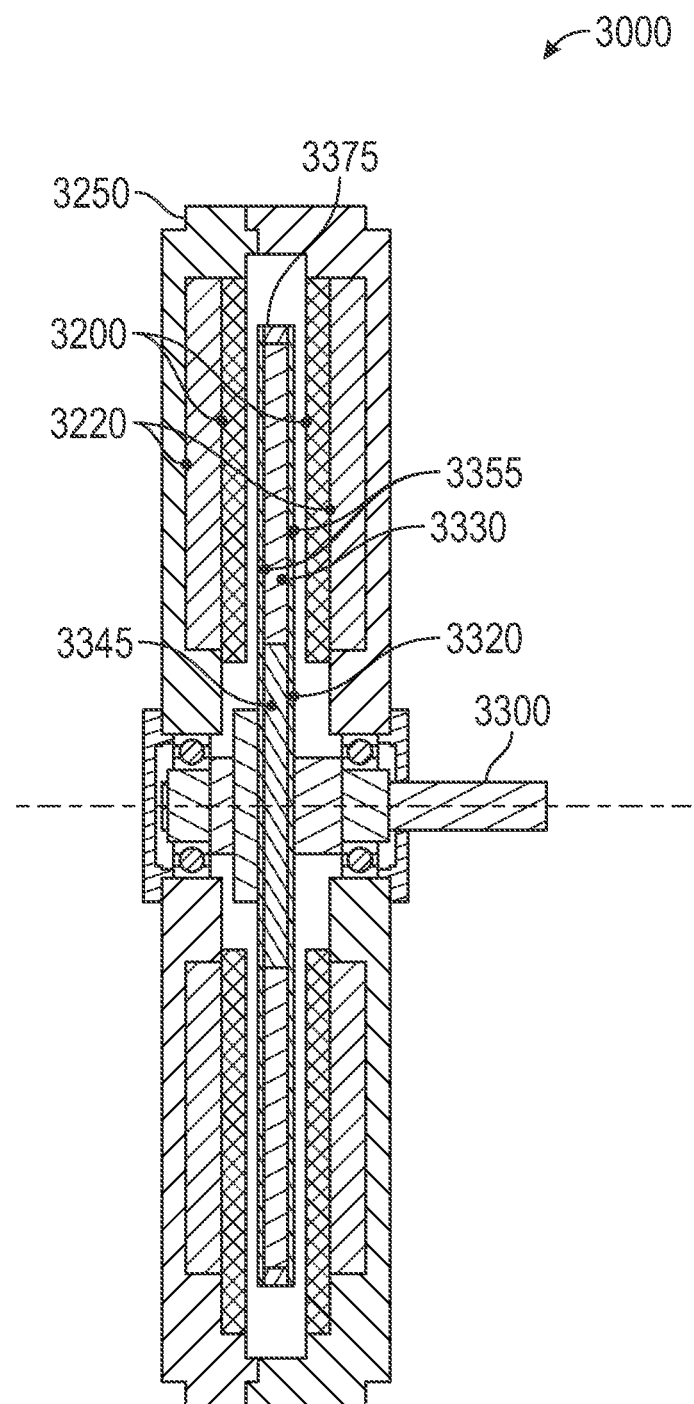
FIG. 9 is a sectional view of another embodiment of an axial field rotary energy device with one rotor and two PCB stators coupled to ferromagnetic yokes.

FIG. 9 shows another example of an embodiment of the axial field rotary energy device 3000 where the rotor 3300 can have a rotor disk 3320 comprising a circular core 3345 sandwiched between two circular plates 3355 to define a circumferential channel that can receive magnets 3330. The circular plates 3355 can be thin (0.5 to 2.0 mm thick, for example) and can extend radially beyond the magnets 3330 to form a recess that can receive a retaining ring 3375. The retaining ring 3375 can be made of carbon fiber composite filaments, or fiber glass composite filaments, for example. The composite filaments can be wound in-situ directly over the magnets 3330, with plates 3355 providing a form to contain the retaining ring 3375 during filament winding. In this embodiment, the circular core 3345 and the plates 3355 can be made of a nonmagnetic material such as carbon fiber composite, Inconel 625, titanium Grade 9 3AL-2.5V, for example, so they do not interfere with the magnetic flux produced by the magnets 3330. In some embodiments, the rotor disk circular core 3345 can be made of a different material than the plates 3355. Alternatively, the circular core 3345 can be made of a light material such as aluminum 6061, for example. In some embodiments the circular core 3345 and one of the plates 3355 can be a single monolithic piece.

Figure 10:
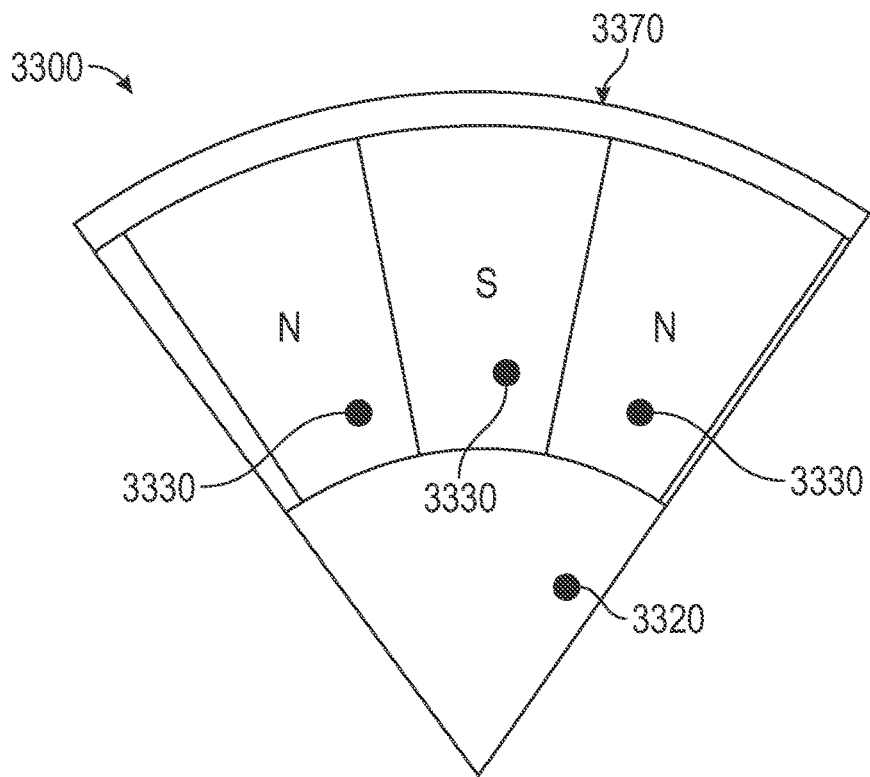
FIG. 10 is a front view of a portion of an embodiment of the rotor of an axial field rotary energy device.

In the embodiments of the device 3000 shown in FIGS. 8 and 9, the magnets 3330 can be mounted side by side on the rotor disk 3320 of the rotor 3300 with no substantial gap between them to form an arch structure that can be contained by the retaining ring 3370 as shown in FIG. 10, which shows a sector of three magnets 3330 of the rotor 3300.

In the embodiments shown in FIGS. 8 and 9, the device 3000 can have PCB stators 3200 facing both sides of the rotor disk 3320. Each PCB stator 3200 can be mechanically coupled to the housing 3250 and to the ferromagnetic yoke 3220. The ferromagnetic yoke 3220 also can be mechanically coupled to the housing 3250. The mechanical coupling between the PCB stators 3200 and the housing 3250 can be the main mechanism whereby the PCB stators 3200 react to the torque generated during the operation of device 3000. The mechanical coupling between the PCB stators 3200 and the corresponding ferromagnetic yokes 3220 is not intended to react to the torque generated during the operation of device 3000. In this embodiment, air gaps 3210 exist between the PCB stators 3200 and the rotor disk 3320. The air gaps 3210 can be substantially equal.

In some embodiments of the device 3000, the ferromagnetic yokes 3220 can be thermally coupled to the PCB stators 3200 and to the housing 1250 by means of thermal paste applied to respective interfaces, for example. In other embodiments, the PCB stators 3200 can be thermally and mechanically coupled to the ferromagnetic yokes 3220 by means of a layer of thermally conductive epoxy adhesive, or a thermally conductive silicone adhesive, for example. In all these embodiments the ferromagnetic yokes 3220 can help conduct the heat generated by the PCB stators 3200 to the housing 3250.

Figure 11:
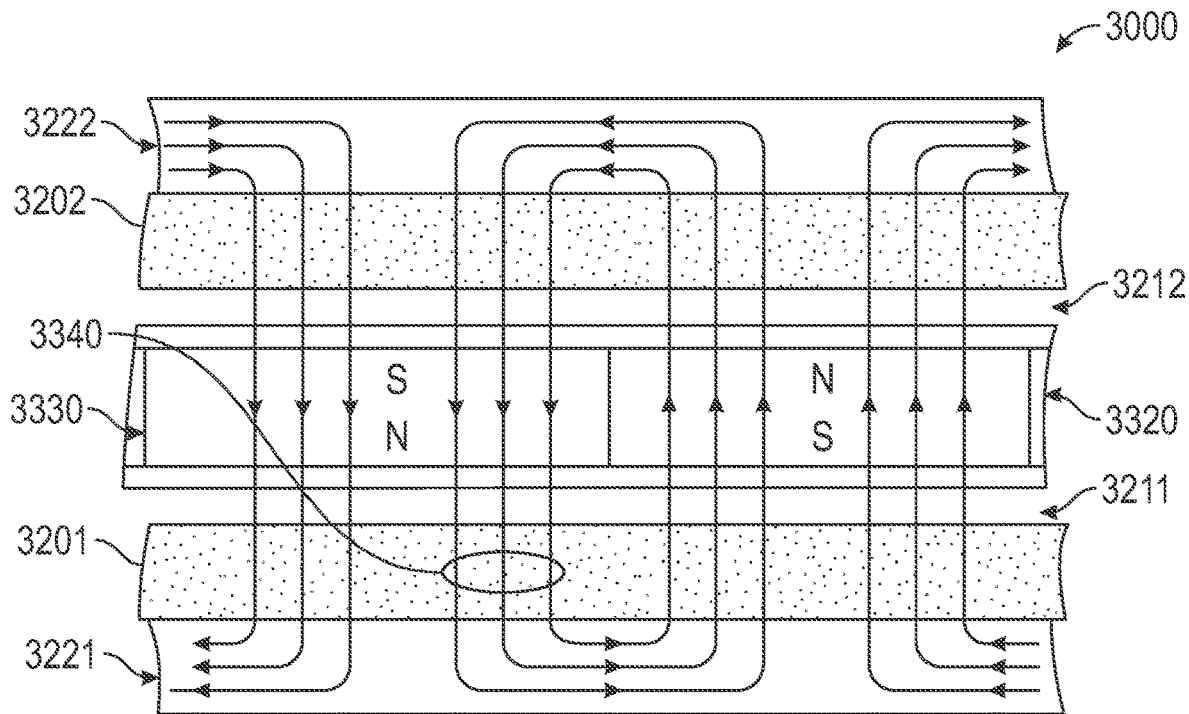
FIG. 11 is a schematic sectional view of the magnet, rotor, PCB stator, and yoke arrangement of an embodiment of an axial field rotary energy device.

FIG. 11 shows a detail of the axial field rotary energy device 3000 shown in FIGS. 8 and 9 depicting the rotor disk 3320, magnets 3330, PCB stators 3201 and 3202, and corresponding ferromagnetic yokes 3221 and 3222. In this embodiment, a magnet 3330 produces a magnetic field, having flux 3340 represented by lines and arrows in FIG. 11. The magnetic flux 3340 flows across a first air gap 3211, a first PCB stator 3201, and into a first ferromagnetic yoke 3221 The magnetic flux 3340 then changes direction, flows sideways, and changes direction again to go back across first PCB stator 3201, first air gap 3211 and through another magnet 3330 adjacent to the first magnet 3330, but with opposite magnetic orientation. The magnetic flux 3340 continues across a second air gap 3212, a second PCB stator 3202, and into a second ferromagnetic yoke 3222. The magnetic flux 3340 then changes direction, flows sideways, and changes direction again to go back across second PCB stator 3202, second air gap 3212 and through magnet 3330. This circulation pattern of magnetic flux 3340 repeats itself around the entire circumference of the axial field rotary energy device 3000. Similar to the embodiments depicted in FIGS. 3A and 3B, examples of the ferromagnetic yokes 3221, 3222 of device 3000 can be made of solid disks of soft ferrite, soft ferrite segments, or laminated soft magnetic materials as depicted in FIGS. 5A and 5B.

In some embodiments of the device 3000, the ferromagnetic yokes 3221, 3222 can have a radial width W that is substantially similar to the magnet radial length L as depicted in FIG. 5C. In other embodiments, the ferromagnetic yoke radial width W can be up to 10% larger or smaller than the magnet radial length L.

Figure 12:
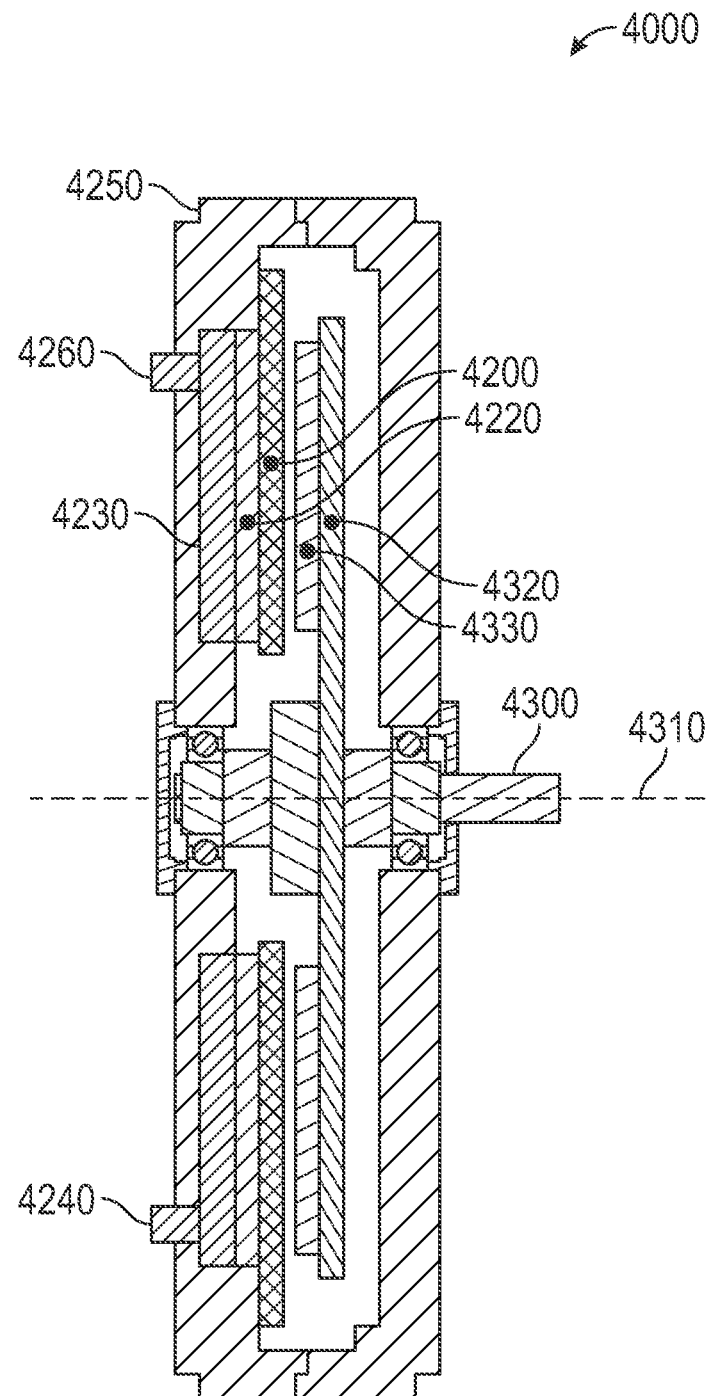
FIG. 12 is a sectional view of an embodiment of an axial field rotary energy device with a cooling plate coupled to a ferromagnetic yoke.

FIG. 12 shows an embodiment of an axial field rotary energy device 4000 having a rotor 4300 that can rotate about an axis of rotation 4310. Rotor 4300 can have one rotor disk 4320 that carries magnets 4330 on only one surface. The magnets 4330 can be mechanically bound to the rotor disk 4320 by means of a high strength adhesive, by means of fasteners or combinations of both, in some examples. Facing the magnets 4330, device 4000 can have a PCB stator 4200 that is coaxial with the rotor 4300 and coupled mechanically to the housing 4250 and a ferromagnetic yoke 4220. The ferromagnetic yoke 4220 also can be coaxial with rotor 4300 and coupled mechanically to the housing 4250. The ferromagnetic yoke 4220 can be coupled mechanically and thermally to a cooling plate 4230, which can be substantially circular in one example. The cooling plate 4230 also can be coaxial with the rotor 4300 and coupled mechanically and thermally to the housing 4250. The mechanical coupling between the PCB stator 4200 and the housing 4250 can be the main mechanism whereby the PCB stator 4200 reacts to the torque generated during the operation of device 4000. The mechanical coupling between the PCB stator 4200 and the corresponding ferromagnetic yoke 4220 is not intended to react to the torque generated during the operation of device 4000, in some examples.

In the embodiment depicted in FIG. 12, the heat generated by the PCB stator 4200 can be conducted through the ferromagnetic yoke 4220 to the cooling plate 4230. The cooling plate 4230 can have continuous sealed channels configured to carry a liquid coolant such as water-glycol, mineral oil, de-ionized water, or salt water, for example. Accordingly, the cooling plate 4230 can be made of a thermally conductive material such as aluminum, copper, copper-nickel alloy, for example. The cooling plate 4230 can have a coolant inlet 4240 and a coolant outlet 4260. Although FIG. 12 shows the coolant inlet 4240 and outlet 4260 approximately diametrically opposed and oriented axially, in other embodiments they can be near each other and can be oriented radially.

Although FIG. 12 shows an axial field rotary energy device 4000 with one rotor 4300, one PCB stator 4200 coupled to one ferromagnetic yoke 4220, which is coupled to one cooling plate 4230, it must be understood that other embodiments of the device can have two or more PCB stators 4200 coupled to ferromagnetic yokes 4220, respectively, which in turn can be coupled to a cooling plates 4230.

Figure 13:
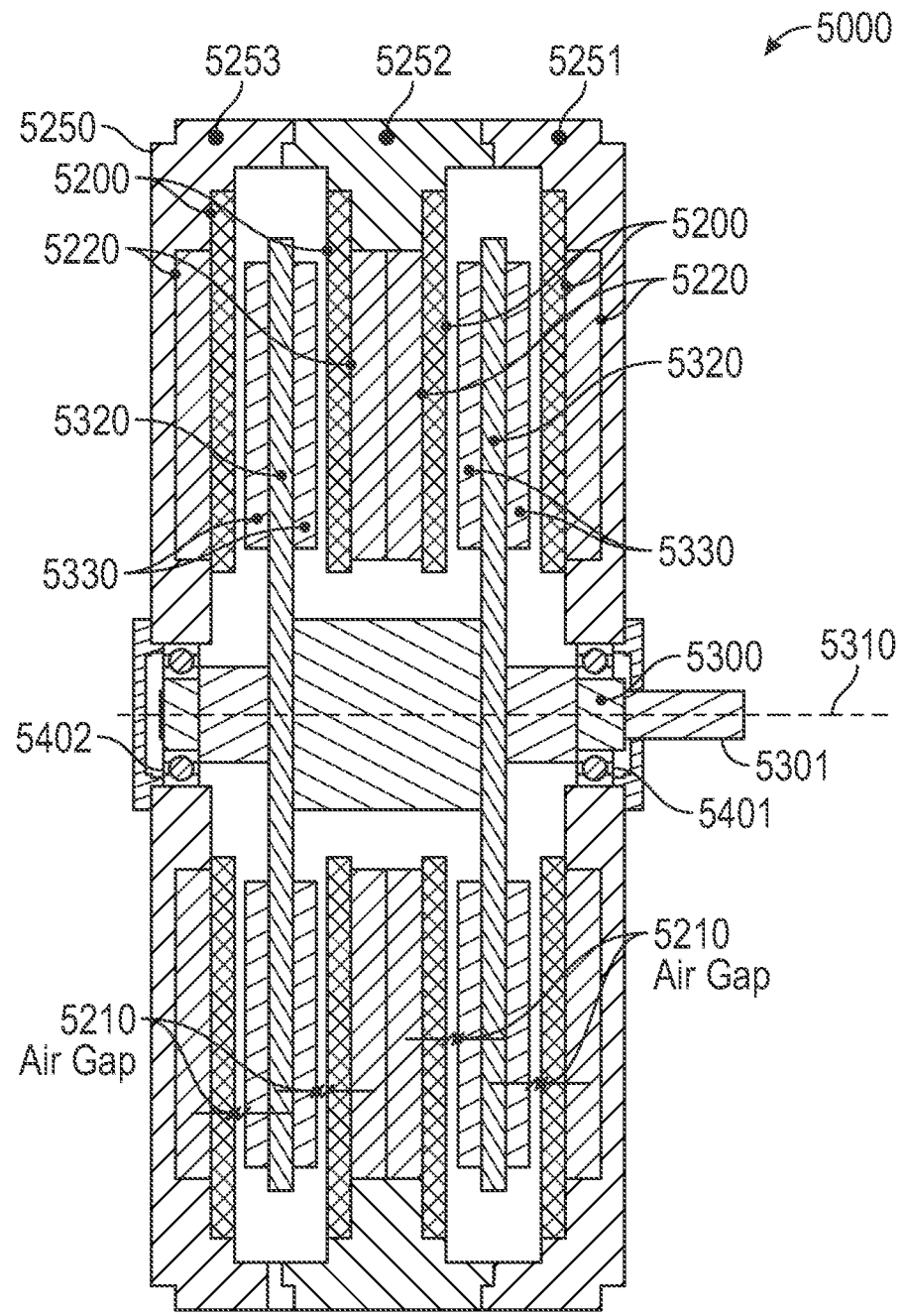
FIG. 13 is a sectional view of another embodiment of an axial field rotary energy device with more than one rotor disk.

In some embodiments where higher power or torque is required, more than one axial field rotary energy device can be coupled together. For example, FIG. 13 shows an embodiment of an axial field rotary energy device 5000 having a rotor 5300 that can rotate about an axis of rotation 5310. Rotor 5300 can have two rotor disks 5320, each carrying magnets 5330 on both major surfaces of each respective rotor disk 5320. Examples of the magnets 5330 can be mechanically bound to the rotor disks 5320 by means of a high strength adhesive, by means of fasteners or combinations of both. Facing the magnets 5330 on both sides of the rotor disks 5320, device 5000 can have PCB stators 5200. Each PCB stator 5200 can be coupled mechanically to the housing 5250 and to a respective ferromagnetic yoke 5220 which, in turn, is coupled mechanically to the housing 5250. Embodiments of housing 5250 can have three axial sections: (1) a first end section 5251 which is configured to receive one PCB stator 5200 and its corresponding ferromagnetic yoke 5220, a bearing 5401 and the drive end 5301 of rotor 5300, for example; (2) a mid-section 5252 that is configured to receive two PCB stators 5200 on opposite sides and their corresponding ferromagnetic yokes 5220; and (3) a second end section 5253 configured to receive one PCB stator 5200 and its corresponding ferromagnetic yoke 5220 and a bearing 5402. The mechanical coupling between the PCB stators 5200 and the housing sections 5251, 5252, 5253 can be the main mechanism whereby the PCB stators 5200 react to the torque generated during the operation of device 5000. The mechanical coupling between the PCB stators 5200 and the corresponding ferromagnetic yokes 5220 is not intended to react to the torque generated during the operation of device 5000, in some versions. In one embodiment, air gaps 5210 exist between the PCB stators 5200 and the respective magnets 5330 mounted to the rotor disks 5320. The air gaps 5210 can be substantially equal, in some examples.

Figure 14:
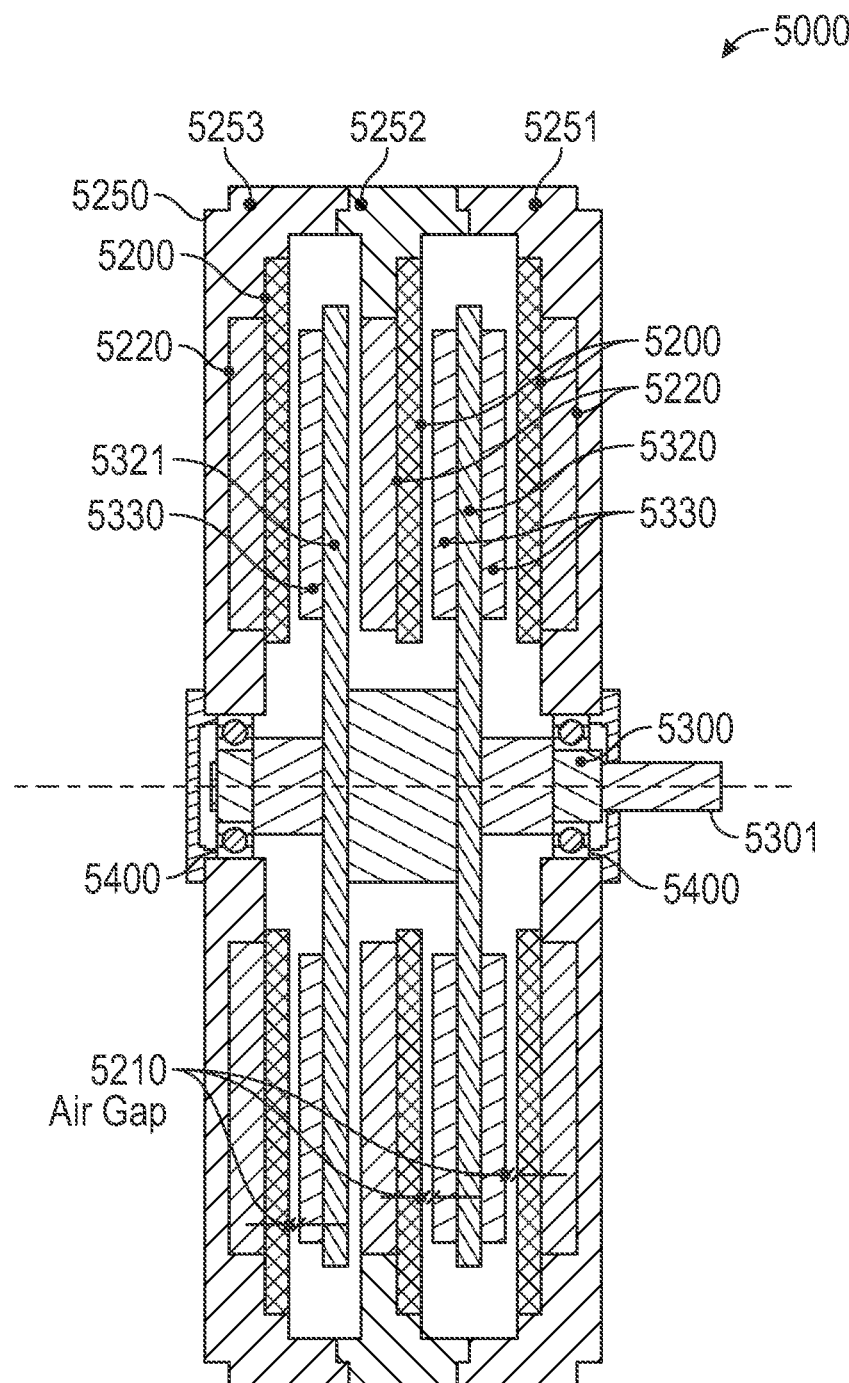
FIG. 14 is a sectional view of still another embodiment of an axial field rotary energy device with more than one rotor disk.

Although FIG. 13 shows an embodiment of the device 5000 with two rotor disks 5320 and four PCB stators 5200, other embodiments are possible. FIG. 14 shows an example of an embodiment of device 5000 where a rotor 5300 can have one rotor disk 5320 carrying magnets 5330 on both major surfaces of the rotor disk 5320, and one rotor disk 5321 carrying magnets 5330 on only one major surface of the rotor disk. In this embodiment, the mid-section 5252 of the housing 5250 is configured to receive just one stator 5200 and its respective ferromagnetic yoke 5220. The end sections 5251 and 5253 of housing 5250 are configured to receive one PCB stator 5200 and its corresponding ferromagnetic yoke 5220, and a bearing 5400. The mechanical coupling between the PCB stators 5200 and the housing sections 5251, 5252, 5253 can be the main mechanism whereby the PCB stators 5200 react to the torque generated during the operation of device 5000. The mechanical coupling between the PCB stators 5200 and the corresponding ferromagnetic yokes 5220 is not intended to react to the torque generated during the operation of device 5000, in this example. In this embodiment, air gaps 5210 exist between the PCB stators 5200 and the magnets 5330 mounted on the rotor disks 5320. The air gaps 5210 can be substantially equal, in some versions.

Although FIGS. 13 and 14 depict embodiments of the device 5000 where at least one of the rotor disks 5320 have magnets 5330 on both major surfaces of disk, it should be understood that other embodiments of device 5000 can have rotor disks 5320 configured similarly to rotor disks 3320 as depicted in FIGS. 8 and 9, where the magnets 3330 are mounted in a circumferential channel formed inside the rotor disk 5320. It also should be understood that some configurations of device 5000 can have cooling plates 4230 (FIG. 12) coupled to the ferromagnetic yokes 5220 similarly to that embodiment.

Some embodiments of device 5000 can have a plurality of mid-sections 5252 with each one configured to be mechanically coupled to two PCB stators 5200 and respective ferromagnetic yokes 5220, and a rotor 5300 configured to carry a plurality of rotor disks 5320 with respective magnets 5330. If the number of rotor disks 5320 is "N", in those embodiments, the number of PCB stators 5200 in the device 5000 is 2N.

Other embodiments can have a plurality of mid-sections 5252 configured to be mechanically coupled to two PCB stators 5200 and respective ferromagnetic yokes 5220, and one mid-section 5252 configured to be mechanically coupled to one PCB stator 5200 and its respective ferromagnetic yoke 5220, and a rotor 5300 configured to carry a plurality of rotor disks 5320 with respective magnets 5330. If the number of rotor disk 5320 is "N", in those embodiments, the number of PCB stators 5200 in the device 5000 is 2N 1.

Figure 15:
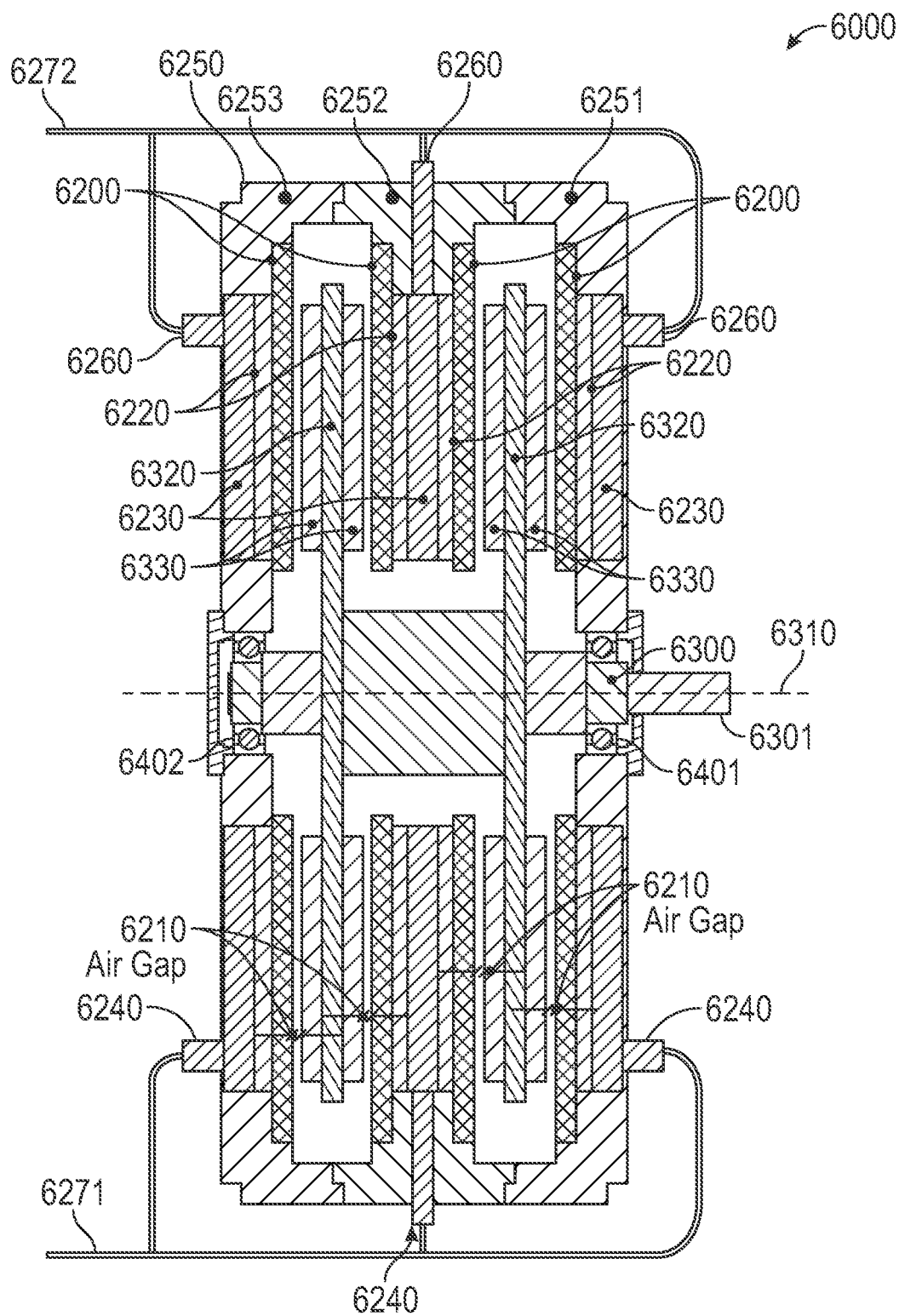
FIG. 15 is a sectional view of another embodiment of an axial field rotary energy device with cooling plates coupled to ferromagnetic yokes.

FIG. 15 shows an embodiment of an axial field rotary energy device 6000 having a rotor 6300 that can rotate about an axis of rotation 6310. In some versions, rotor 6300 can have two rotor disks 6320, each carrying magnets 6330 on both major surfaces of each respective rotor disk. Examples of the magnets 6330 can be mechanically bound to the rotor disks 6320 by means of a high strength adhesive, by means of fasteners or combinations of both. Facing the magnets 6330 on both sides of the disks 6320, embodiments of the device 6000 can have PCB stators 6200. Each PCB stator 6200 can be coupled mechanically to the housing 6250 and to a ferromagnetic yoke 6220. Versions of the ferromagnetic yoke 6220 can be coupled mechanically and thermally to a substantially circular cooling plate 6230 which can be coaxial with the rotor 6300 and coupled mechanically and thermally to sections of the housing 6250.

In the embodiment shown in FIG. 15, housing 6250 can have three axial sections: (1) a first end section 6251 which is configured to receive one PCB stator 6200 and its corresponding ferromagnetic yoke 6220 and cooling plate 6230, a bearing 6401 and the drive end 6301 of rotor 6300, for example; (2) a mid-section 6252 that is configured to receive two PCB stators 6200 on opposite sides and their corresponding ferromagnetic yokes 6220, and a cooling plate 6230 configure to be in thermal contact with the ferromagnetic yokes 6220; and (3) a second end section 6253 configured to receive one PCB stator 6200 and its corresponding ferromagnetic yoke 6220 and a bearing 6402. The mechanical coupling between the PCB stators 6200 and the housing sections 6251 to 6253 can be the main mechanism whereby the PCB stators react to the torque generated during the operation of device 6000. The mechanical coupling between the PCB stators 6200 and the corresponding ferromagnetic yokes 6220 is not intended to react to the torque generated during the operation of device 6000, in some versions. In this embodiment, air gaps 6210 exist between the PCB stators 6200 and the magnets 6330 mounted on the rotor disks 6320. The air gaps 6210 can be substantially equal, in some examples.

In the embodiment depicted in FIG. 15, the heat generated by the PCB stators 6200 can be conducted through the ferromagnetic yokes 6220 to the cooling plates 6230. The cooling plates 6230 can have continuous sealed channels configured to carry a liquid coolant such as water-glycol, mineral oil, de-ionized water, or salt water, for example. Accordingly, the cooling plate 6230 can be made of a thermally conductive material such as aluminum, copper, copper-nickel alloy, for example. The cooling plates 6230 can have a coolant inlet 6240 and a coolant outlet 6260. In some embodiments, the coolant inlets 6240 can be connected to a common manifold 6271 and the coolant outlets 6260 can be connected to a common manifold 6272. However, in other embodiments, the inlets 6240 and outlets 6260 can be connected to individual coolant lines. In some embodiments, the cooling plates 6230 in the end sections 6251 and 6253 can be absent.

Some embodiments of device 6000 can have a plurality of mid-sections 6252 with each one configured to be mechanically coupled to two PCB stators 6200 and respective ferromagnetic yokes 6220 having a common cooling plate 6230, and a rotor 6300 configured to carry a plurality of rotor disks 6320 with respective magnets 6330. If the number of rotor disks 6320 is "N", in those embodiments, the number of PCB stators 6200 in the device 6000 is 2N.

Other embodiments can have a plurality of mid-sections 6252 configured to be mechanically coupled to two PCB stators 6200, their respective ferromagnetic yokes 6220 and a common cooling plate 6230. One mid-section 6252 can be configured to be mechanically coupled to one PCB stator 6200, its respective ferromagnetic yoke 6220, a cooling plate 6230, and a rotor 6300 configured to carry a plurality of rotor disks 6320 with respective magnets 6330. If the number of rotor disks 6320 is "N", in those embodiments, the number of PCB stators 6200 in the device 6000 is 2N 1.

Other embodiments can include one or more of the following items.

An axial field rotary energy device, comprising:
  a housing;
  a rotor coupled to the housing, the rotor comprising an axis of rotation and a rotor disk having a magnet;
  a stator coaxial with the rotor, the stator comprising a printed circuit board (PCB) having a plurality of conductive layers laminated together with layers of an insulating material, each conductive layer comprises a plurality of coils that can carry electrical current when connected to an external voltage source, and the stator is mechanically coupled to the housing, so the stator reacts to torque produced by the device; and
  a ferromagnetic yoke coaxial with the rotor and stator, the ferromagnetic yoke is mechanically and thermally coupled to the stator and the housing to provide a path for magnetic flux produced by the magnet and a path to conduct heat generated by the stator from the stator to the housing.

The device wherein the ferromagnetic yoke comprises a radial width W that is in a range of 90% to 110% of a radial length L of the magnet.

The device wherein the ferromagnetic yoke comprises a low loss, soft ferromagnetic material.

The device wherein the ferromagnetic yoke comprises a single annular ring of soft ferrite.

The device wherein the soft ferrite comprises a Mn—Zn or Ni—Zn compound.

The device wherein the ferromagnetic yoke comprises segments of soft ferrite.

The device wherein the soft ferrite comprises a Mn—Zn or Ni—Zn compound.

The device wherein the ferromagnetic yoke is laminated and comprises a wound strip of low loss, high permeability, soft ferromagnetic alloy.

The device wherein the ferromagnetic yoke comprises a relative permeability of 5,000 or more.

The device wherein each conductive layer is etched.

An axial field rotary energy device, comprising:
 a housing;
 a rotor coupled to the housing and comprising an axis of rotation and a rotor disk carrying magnets on both sides of the rotor disk;
 two stators coaxial with the rotor and facing the rotor, each stator comprising a printed circuit board (PCB) having a plurality of conductive layers laminated together with layers of an insulating material, each conductive layer comprises a plurality of coils that can carry electrical current when connected to an external voltage source, and the stators are mechanically coupled to the housing, so the stators react to torque produced by the device;
 two ferromagnetic yokes coaxial with the rotor and the stators, the ferromagnetic yokes are mechanically and thermally coupled to the stators, respectively, and the housing to provide a path for magnetic flux produced by the magnets and a path to conduct heat generated by the stator from the stator to the housing; and
 wherein the rotor is located axially between the two stators.

The device wherein the ferromagnetic yoke comprises a radial width W that is in a range of 90% to 110% of a radial length L of the magnets.

The device wherein the ferromagnetic yoke comprises a low loss, soft ferromagnetic material.

The device wherein the ferromagnetic yoke comprises a single annular ring of soft ferrite.

The device wherein the soft ferrite material comprises a Mn—Zn or Ni—Zn compound.

The device wherein the ferromagnetic yoke comprises segments of soft ferrite.

The device wherein the soft ferrite material comprises a Mn—Zn or Ni—Zn compound.

The device wherein the ferromagnetic yoke is laminated and comprises a wound strip of low loss, high permeability, soft ferromagnetic alloy.

The device wherein the ferromagnetic yoke material comprises a relative permeability of 5,000 or more.

The device wherein each conductive layer is etched.

An axial field rotary energy device, comprising:
 a housing;
 a rotor coupled to the housing, the rotor comprising an axis of rotation and a rotor disk that is nonmagnetic and comprises a recess and cover plates that are nonmagnetic to form a circumferential channel to carry magnets, wherein the rotor disk, the cover plates, and the magnets have substantially the same outer diameter, and a retaining ring that is nonmagnetic to contain the magnets inside the circumferential channel, where the magnets form an arch structure contained by the retaining ring;
 two stators coaxial with the rotor and facing the rotor, each stator comprising a printed circuit board (PCB) having a plurality of conductive layers laminated together with layers of an insulating material, each conductive layer comprises a plurality of coils that can carry electrical current when connected to an external voltage source, and the stators are mechanically coupled to the housing, so the stators react to torque produced by the device;
 two ferromagnetic yokes coaxial with the rotor and the stators, the ferromagnetic yokes are mechanically and thermally coupled to the stators, respectively, and the housing to provide a path for magnetic flux produced by the magnets and a path to conduct heat generated by the stators from the stators to the housing; and
 wherein the rotor is located axially between the two stators.

The device wherein the circumferential channel in the rotor disk comprises wall that have a thickness that is in a range of 0.5 mm to 2.0 mm.

The device wherein the ferromagnetic yoke has a radial width W that is in a range of 90% to 110% of a radial length L of the magnets.

The device wherein the ferromagnetic yoke comprises a low loss, soft ferromagnetic material.

The device wherein the ferromagnetic yoke comprises a single annular ring of soft ferrite.

The device wherein the soft ferrite comprises a Mn—Zn or Ni—Zn compound.

The device wherein the ferromagnetic yoke comprises segments of soft ferrite.

The device wherein the soft ferrite comprises a Mn—Zn or Ni—Zn compound.

The device wherein the ferromagnetic yoke is laminated and comprises a wound strip of low loss, high permeability, soft ferromagnetic alloy.

The device wherein the ferromagnetic yoke material comprises a relative permeability of 5,000 or more.

The device wherein the cover plates that form the rotor disk circumferential channel have an outer diameter that is greater than an outer diameter of the magnets to form a recess to receive the retaining ring, wherein the retaining ring comprises a wound filaments that are wound in-situ on the rotor disk.

The device where the retaining ring comprises carbon fiber composite filament.

The device wherein each conductive layer is etched.

An axial field rotary energy device, comprising:
 a housing;
 a rotor coupled to the housing, the rotor comprising an axis of rotation and a rotor disk comprising a magnet;
 a cooling plate coaxial with the rotor and coupled to the housing, the cooling plate comprising a continuous sealed channel connected to an inlet and an outlet and configured to convey a liquid coolant;
 a stator coaxial with the rotor and comprising a printed circuit board (PCB) having a plurality of conductive layers laminated together with layers of an insulating material, each conductive layer comprises a plurality of coils that can carry electrical current when connected to an external voltage source, and the stator is mechanically coupled to the housing, so the stator reacts to torque produced by the device; and a ferromagnetic yoke coaxial with the rotor and the stator, the ferromagnetic yoke is mechanically and thermally coupled to the stator and to the cooling plate to provide a path for magnetic flux produced by the magnet and a path to conduct heat generated by the stator from the stator to the cooling plate.

The device wherein the ferromagnetic yoke comprises a radial width W that is in a range of 90% to 110% of a radial length L of the magnet.

The device wherein the ferromagnetic yoke comprises a low loss, soft ferromagnetic material.

The device wherein the ferromagnetic yoke comprises a single annular ring of soft ferrite.

The device wherein the soft ferrite comprises a Mn—Zn or Ni—Zn compound.

The device wherein the ferromagnetic yoke comprises segments of soft ferrite.

The device wherein the soft ferrite material comprises a Mn—Zn or Ni—Zn compound.

The device wherein the ferromagnetic yoke is laminated and comprises a wound strip of low loss, high permeability, soft ferromagnetic alloy.

The device wherein the ferromagnetic yoke material comprises a relative permeability of 5,000 or more.

The device wherein the rotor disk carries magnets on both sides, the device comprises two stators coaxial with the rotor and facing the rotor, and each stator is mechanically and thermally coupled to a respective ferromagnetic yoke and each yoke is coupled thermally and mechanically to a respective cooling plate.

The device wherein the ferromagnetic yoke comprises a radial width W that is in a range of 90% to 110% of a radial length L of the magnet.

The device wherein the ferromagnetic yoke comprises a low loss, soft ferromagnetic material.

The device wherein the ferromagnetic yoke comprises a single annular ring of soft ferrite.

The device wherein the soft ferrite comprises a Mn—Zn or Ni—Zn compound.

The device wherein the ferromagnetic yoke comprises segments of soft ferrite.

The device wherein the soft ferrite material comprises a Mn—Zn or Ni—Zn compound.

The device wherein the ferromagnetic yoke is laminated and comprises a wound strip of low loss, high permeability, soft ferromagnetic alloy.

The device wherein the ferromagnetic yoke material comprises a relative permeability of 5,000 or more.

The device wherein each conductive layer is etched.

The device wherein there is only one air gap for the stator in the device.

An axial field rotary energy device, comprising:
a housing;
a rotor coupled to the housing and comprising an axis of rotation and a plurality of rotor disks, each rotor disk comprising magnets;
stators coaxial with the rotor, each stator comprising a printed circuit board (PCB) having a plurality of conductive layers laminated together with layers of an insulating material, each conductive layer comprises a plurality of coils that can carry electrical current when connected to an external voltage source, and the stators are mechanically coupled to the housing, so the stators react to torque produced by the device;

the housing comprises two end sections and a plurality of mid-sections wherein:

the end sections are configured to be mechanically coupled a respective stator and a respective ferromagnetic yoke; and the mid-sections are configured to be mechanically coupled to one or two stators and respective ferromagnetic yokes; and wherein the ferromagnetic yokes are coaxial with the rotor and the stators, the ferromagnetic yokes are mechanically and thermally coupled to the stators, respectively, and to the housing to provide a path for magnetic flux produced by the magnets and a path to conduct heat generated by the stators from the stators to the housing; and then rotor disks are axially located between respective stators.

The device wherein the ferromagnetic yoke comprises a radial width W that is in a range of 90% to 110% of a radial length L of the magnets.

The device wherein the ferromagnetic yoke comprises a low loss, soft ferromagnetic material.

The device wherein the ferromagnetic yoke comprises a single annular ring of soft ferrite.

The device wherein the soft ferrite comprises a Mn—Zn or Ni—Zn compound.

The device wherein the ferromagnetic yoke comprises segments of soft ferrite.

The device wherein the soft ferrite comprises a Mn—Zn or Ni—Zn compound.

The device wherein the ferromagnetic yoke is laminated and comprises a wound strip of low loss, high permeability, soft ferromagnetic alloy.

The device wherein the ferromagnetic yoke comprises a relative permeability of 5,000 or more.

The device wherein each conductive layer is etched.

An axial field rotary energy device, comprising:
a housing;
a rotor coupled to the housing and comprising an axis of rotation and a plurality of rotor disks comprising magnets;
stators coaxial with the rotor and comprising a printed circuit board (PCB) having a plurality of conductive layers laminated together with layers of an insulating material, each conductive layer comprises a plurality of coils that can carry electrical current when connected to an external voltage source, and the stators are mechanically coupled to the housing, so the stators react to torque produced by the device;
ferromagnetic yokes coaxial with the rotor and the stators, the ferromagnetic yokes are mechanically and thermally coupled to the stators, respectively, and to cooling plates, to provide a path for magnetic flux produced by the magnets and a path to conduct heat generated by the respective stators from the stators to the cooling plates, respectively;
the cooling plates coaxial with the rotor and coupled to the ferromagnetic yokes, respectively, and the cooling plates comprise a continuous sealed channel connected to an inlet and an outlet and configured to convey a liquid coolant;
the housing comprises two end sections and a plurality of mid-sections wherein:
the end sections are configured to be mechanically coupled a respective stator, a respective ferromagnetic yoke, and a respective cooling plate;

the mid-sections are configured to be mechanically coupled to one or two stators, respective ferromagnetic yokes, and a respective cooling plate.

The device wherein the ferromagnetic yoke comprises a radial width W that is in a range of 90% to 110% of a radial length L of the magnets.

The device wherein the ferromagnetic yokes comprise a low loss, soft ferromagnetic material.

The device wherein the ferromagnetic yoke comprises a single annular ring of soft ferrite.

The device wherein the soft ferrite comprises a Mn—Zn or Ni—Zn compound.

The device wherein the ferromagnetic yoke comprises segments of soft ferrite.

The device wherein the soft ferrite comprises a Mn—Zn or Ni—Zn compound.

The device wherein the ferromagnetic yoke is laminated and comprises a wound strip of low loss, high permeability, soft ferromagnetic alloy.

The device wherein the ferromagnetic yoke comprises a relative permeability of 5,000 or more.

The device wherein the cooling plates are connected to a common inlet manifold and to a common outlet manifold.

The device wherein the housing end sections do not have cooling plates.

The device wherein each conductive layer is etched.

The device wherein there is only one air gap for each stator in the device.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom," and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

This written description uses examples to disclose the embodiments, including the best mode, and also to enable those of ordinary skill in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It can be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Also, the use of "a" or "an" is employed to describe elements and components described herein. This is done merely for convenience and to give a general sense of the scope of the invention. This description should be read to include one or at least one and the singular also includes the plural unless it states otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, sacrosanct or an essential feature of any or all the claims.

After reading the specification, skilled artisans will appreciate that certain features which are, for clarity, described herein in the context of separate embodiments, can also be provided in combination in a single embodiment. Conversely, various features that are, for brevity, described in the context of a single embodiment, can also be provided separately or in any sub-combination. Further, references to values stated in ranges include each and every value within that range.

What is claimed is:

1. An axial field rotary energy device, comprising:
    a housing;
    a rotor coupled to the housing, the rotor comprising an axis of rotation and a rotor disk comprising a magnet;
    a cooling plate coaxial with the rotor and coupled to the housing, the cooling plate comprising a continuous sealed channel connected to an inlet and an outlet and configured to convey a liquid coolant;
    a stator coaxial with the rotor and comprising a printed circuit board (PCB) having a plurality of conductive layers laminated together with layers of an insulating material, each conductive layer comprises a plurality of coils that can carry electrical current when connected to an external voltage source, and the stator is mechanically coupled to the housing, so the stator reacts to torque produced by the device; and
    a ferromagnetic yoke coaxial with the rotor and the stator, the ferromagnetic yoke is mechanically and thermally coupled to the stator and to the cooling plate to provide a path for magnetic flux produced by the magnet and a path to conduct heat generated by the stator from the stator to the cooling plate.

2. The device of claim 1, wherein the ferromagnetic yoke comprises a radial width W that is in a range of 90% to 110% of a radial length L of the magnet.

3. The device of claim 2, wherein the ferromagnetic yoke comprises a low loss, soft ferromagnetic material.

4. The device of claim 3, wherein the ferromagnetic yoke comprises a single annular ring of soft ferrite.

5. The device of claim 4, wherein the soft ferrite comprises a Mn—Zn or Ni—Zn compound.

6. The device of claim 3, wherein the ferromagnetic yoke comprises segments of soft ferrite.

7. The device of claim 6, wherein the soft ferrite material comprises a Mn—Zn or Ni—Zn compound.

8. The device of claim 3, wherein the ferromagnetic yoke is laminated and comprises a wound strip of low loss, high permeability, soft ferromagnetic alloy.

9. The device of claim 8, wherein the ferromagnetic yoke comprises a relative permeability of 5,000 or more.

10. The device of claim 1, wherein the rotor disk carries magnets on both sides, the device comprises two stators coaxial with the rotor and facing the rotor, and each stator is mechanically and thermally coupled to a respective ferromagnetic yoke and each yoke is coupled thermally and mechanically to a respective cooling plate.

11. The device of claim 10, wherein the ferromagnetic yoke comprises a radial width W that is in a range of 90% to 110% of a radial length L of the magnet.

12. The device of claim 11, wherein the ferromagnetic yoke comprises a low loss, soft ferromagnetic material.

13. The device of claim 12, wherein the ferromagnetic yoke comprises a single annular ring of soft ferrite.

14. The device of claim 13, wherein the soft ferrite comprises a Mn—Zn or Ni—Zn compound.

15. The device of claim 12, wherein the ferromagnetic yoke comprises segments of soft ferrite.

16. The device of claim 15, wherein the soft ferrite material comprises a Mn—Zn or Ni—Zn compound.

17. The device of claim 12, wherein the ferromagnetic yoke is laminated and comprises a wound strip of low loss, high permeability, soft ferromagnetic alloy.

18. The device of claim 17, wherein the ferromagnetic yoke comprises a relative permeability of 5,000 or more.

19. The device of claim 10, wherein each conductive layer is etched.

20. The device of claim 1, wherein there is only one air gap for the stator in the device.

* * * * *